United States Patent [19]

Ts'ao

[11] 3,988,550
[45] Oct. 26, 1976

[54] TELEPHONE REPERTORY DIALER

[76] Inventor: Si-Ling Ts'ao, 39-1 Alley 30, Lane 172, Section 1, Keelung Road, Taipei, China /Taiwan

[22] Filed: Nov. 6, 1974

[21] Appl. No.: 521,266

Related U.S. Application Data

[63] Continuation-in-part of Ser. No. 436,177, Jan. 24, 1974, abandoned.

[52] U.S. Cl. .......................................... 179/90 BB
[51] Int. Cl.² .......................................... H04M 1/46
[58] Field of Search.......... 179/90 B, 90 BB, 90 BD, 179/90 R

[56] References Cited
UNITED STATES PATENTS

| | | | |
|---|---|---|---|
| 3,365,549 | 1/1968 | Moseley et al. | 179/90 BD |
| 3,456,085 | 7/1969 | Huizinga et al. | 179/90 K |
| 3,488,451 | 1/1970 | Nenninger et al. | 179/90 K |

*Primary Examiner*—Kathleen H. Claffy
*Assistant Examiner*—G. Brigance
*Attorney, Agent, or Firm*—Robert F. O'Connell

[57] ABSTRACT

An automatic telephone dialing apparatus wherein a plurality of telephone numbers are stored in a storage medium for rapid retrieval thereof upon the actuation of a single button to produce a complete dialing signal for a telephone system. The apparatus is designed so that information identifying successive numeral digits of each telephone number is stored in accordance with various alternative schemes such that numeral digits in corresponding digit positions of each telephone number form at least one of a plurality of separate groups each group being stored at a different region of the storage medium. Thus, in one example thereof, the digits corresponding to the first numeral of each telephone number are stored successively at a first region, the digits corresponding to the second numeral of each telephone number are stored successively at a second region, and so on, until the digits corresponding to the last numeral of each telephone number are stored at a last region of the storage medium all in the same order.

35 Claims, 20 Drawing Figures

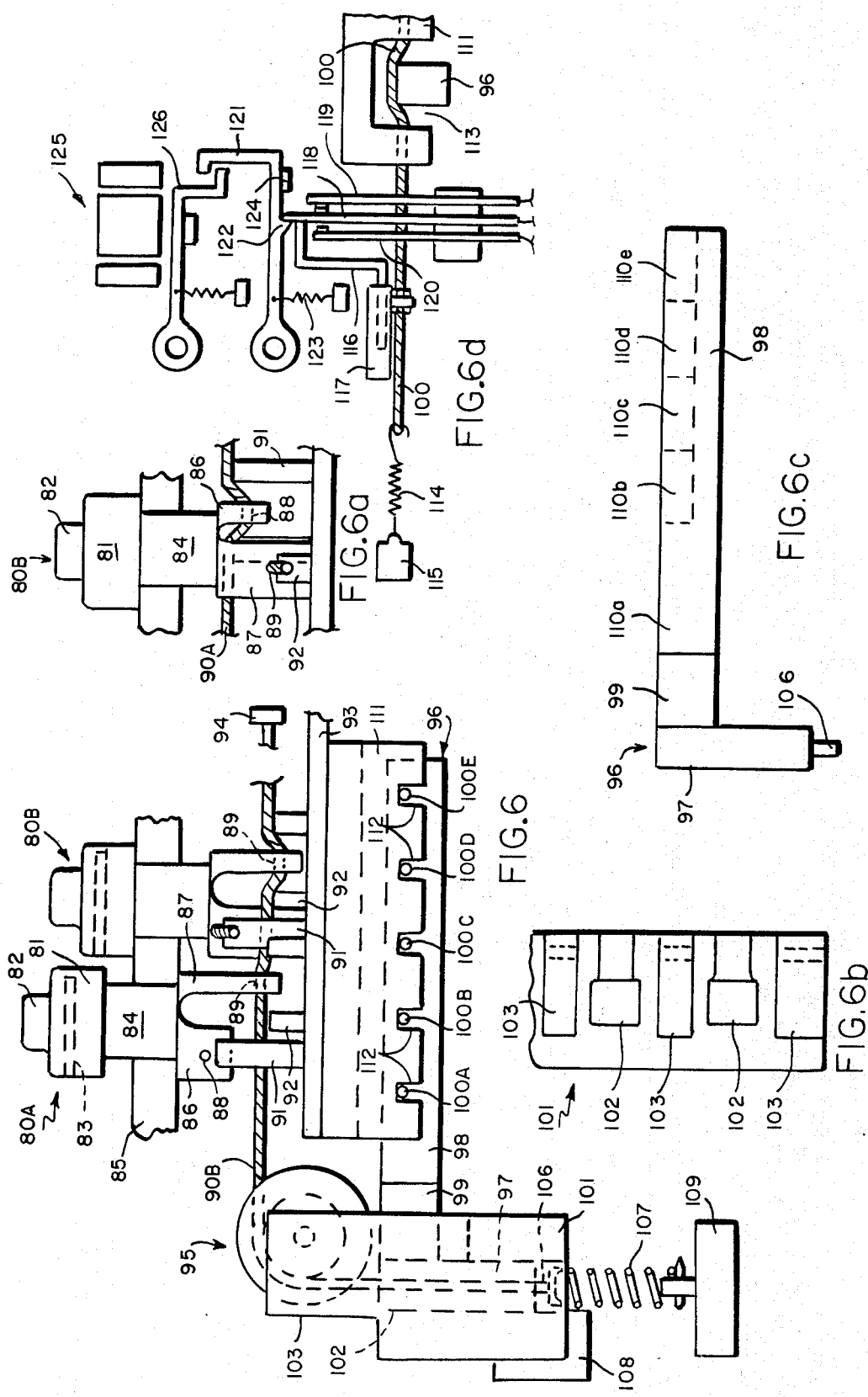

TELEPHONE REPERTORY DIALER

This application is a continuation-in-part of Ser. No. 436,177, filed 1/24/74, now abandoned.

INTRODUCTION

This invention relates generally to telephone dialing systems and, more particularly, to repertory dialer systems for providing automatic dialing of a relatively large number of different telephone numbers by a single manual operation by a subscriber.

BACKGROUND OF THE INVENTION

Telephone repertory dialers offer many advantages to telephone subscribers and become even more advantageous as the total number of digits identifying each telephone location increases. The purpose of such repertory dialing systems is to enable a subscriber to dial a number more rapidly and with less effort than it would take for him to manually dial the same number either via a conventional rotating dial or a push-button dialing system. In a repertory system, only one, or a few, manual operations are required on the part of a subscriber even though the number of digits in the desired telephone number is relatively large. To justify the investment on the part of a subscriber, a repertory dialing system must be capable of providing the automatic access and dialing of a relatively large number of frequently-called telephone numbers so that the savings in time and the increase in convenience to the subscriber are sufficiently great.

BRIEF DESCRIPTION OF THE PRIOR ART

Prior art repertory dialers have used systems involving coded gears, discs and the like (e.g., U.S. Pat. No. 2,929,884), which devices are costly to make and are difficult to modify when the telephone numbers stored therein are required to be changed. Other systems have used punched cards (as in U.S. Pat. No. 3,274,345, for example). While such systems are sometimes less expensive and more easily changed, they are less conveniently used by a subscriber, who must select the desired card from a file, insert it into a slot, push an operating button before a call and then return the card to its proper position after a call. Such operations consume so much time that there is little savings in time and effort when compared, for example, with presently available push-button dialing systems which do not use repertory dialing apparatus.

Still other repertory dialers use magnetic tapes, or drums, which make it relatively convenient to record frequently called telephone numbers but which all require a preliminary operation of aligning the recorded portion of the tape or the drum to the magnetic record/read head (R/R head) by means of the relatively slow and inconvenient rotation of a knob, or the like, and then the pushing of a call button. Still other apparatus uses complicated centralized memory equipment for storing telephone digits (as in U.S. Pat. No. 3,493,688, for example), which system is relatively costly and requires skillful personnel at the central station to encode or change a telephone number for a subscriber. Moreover, the subscriber is required to remember two digits for each frequently called telephone and then to operate the ten numerical buttons twice for each call. Further, most repertory dialers are bulky and the costs thereof increase greatly if they are required to store a large number of telephones at the subscriber station.

SUMMARY OF THE INVENTION

The present invention overcomes the disadvantages of prior art repertory dialers by providing a system in which the frequently called numbers are easy to encode and simple to call and in which it is convenient to replace an existing encoded number or to add a new number to the system. Moreover, such a system is compact and economical to make and operate. Further, the system of the invention may be used to accommodate two modes of signalling, i.e., both a DC (Impulse) mode and an AC (Multifrequency) mode, such modes being operable not only in the same dialers but also with respect to the same pre-encoded telephone number. The latter advantage is particularly useful as telephone switchboards in various countries of the world are changed from DC signalling to AC signalling modes from time to time over a relatively long period of time. Thus, the dialer of the invention may be used to signal telephone switchboards using DC signals or AC signals, or it may be used to send a part of its signals in the form of DC impulses and a part of its signals in the form of AC dual frequencies, for example, merely by pushing a single button during a call. Therefore, the dialer would not become obsolete when the switching system is converted from DC to AC.

Accordingly, the invention provides a novel telephone repertory dialer in which it is easy to record frequently called telephone numbers by simply pushing numerical buttons in succession and in which it is convenient to start and complete a call by simply pushing a single repertory button. Moreover, the system is capable of storing a relatively large number of telephone numbers in a compact space. Further, the system does not need skilled personnel to assist the subscriber in encoding or in changing the encoding of any of the stored telephone numbers. The system of the invention can be designed to complete a call in only a second, or two, for an AC signalling mode and in as fast a speed as possible for a DC signalling mode or for a combined AC/DC signalling mode.

In accordance with one system of the invention, a magnetic storage medium of continuous nature, such as magnetic drum, tape loop, disk or wire is used to store frequently called telephone numbers. However, the system differs from prior art systems wherein the successive telephone digits of any telephone number are successively recorded, one after one, on a magnetic track. In such prior systems it is necessary for the subscriber, before making a call, to bring the record/read (R/R) magnetic head to the pre-recorded track manually, usually by slowly rotating a knob manually or by rapidly rotating the drum or tape by a motor to the general region of the desired track and subsequently manually aligning the head with the exact track location. A button is then depressed to permit such track alone to be scanned. Overall, such operation is both inconvenient and slower than desired, particularly where calls are made relatively frequently.

In contrast, the system of this invention records all first digits of all frequently called telephone numbers in succession. Such recordal is then followed by the recordal of all second digits of the same telephone numbers in the same order in succession after an appropriate interval. Subsequently, all third digits, all fourth digits, and so on, are recorded until all last digits of such numbers have been recorded in succession. When any telephone number is required to be called, the entire magnetic medium is scanned so that there is no need to align the R/R head before the call. Only the first digit, second digit, etc. up through the last digit of the desired telephone number after being picked up by the R/R head are converted to the required forms of signalling to be sent out on the outgoing telephone lines to effect the operation of automatic dialing.

The invention can be better understood with reference to the following drawings wherein FIG. 1 shows a plurality of wave forms which depict the positions upon a continuous magnetic medium where the various digits of all stored telephone numbers are recorded, together with the DC mode signal as well as the associated recording frequencies and forms of other signals involved;

FIGS. 6, 6a, 6b, 6c and 6d show another embodiment of a novel design of repertory buttons and their associated memory mechanism;

Figure 1:
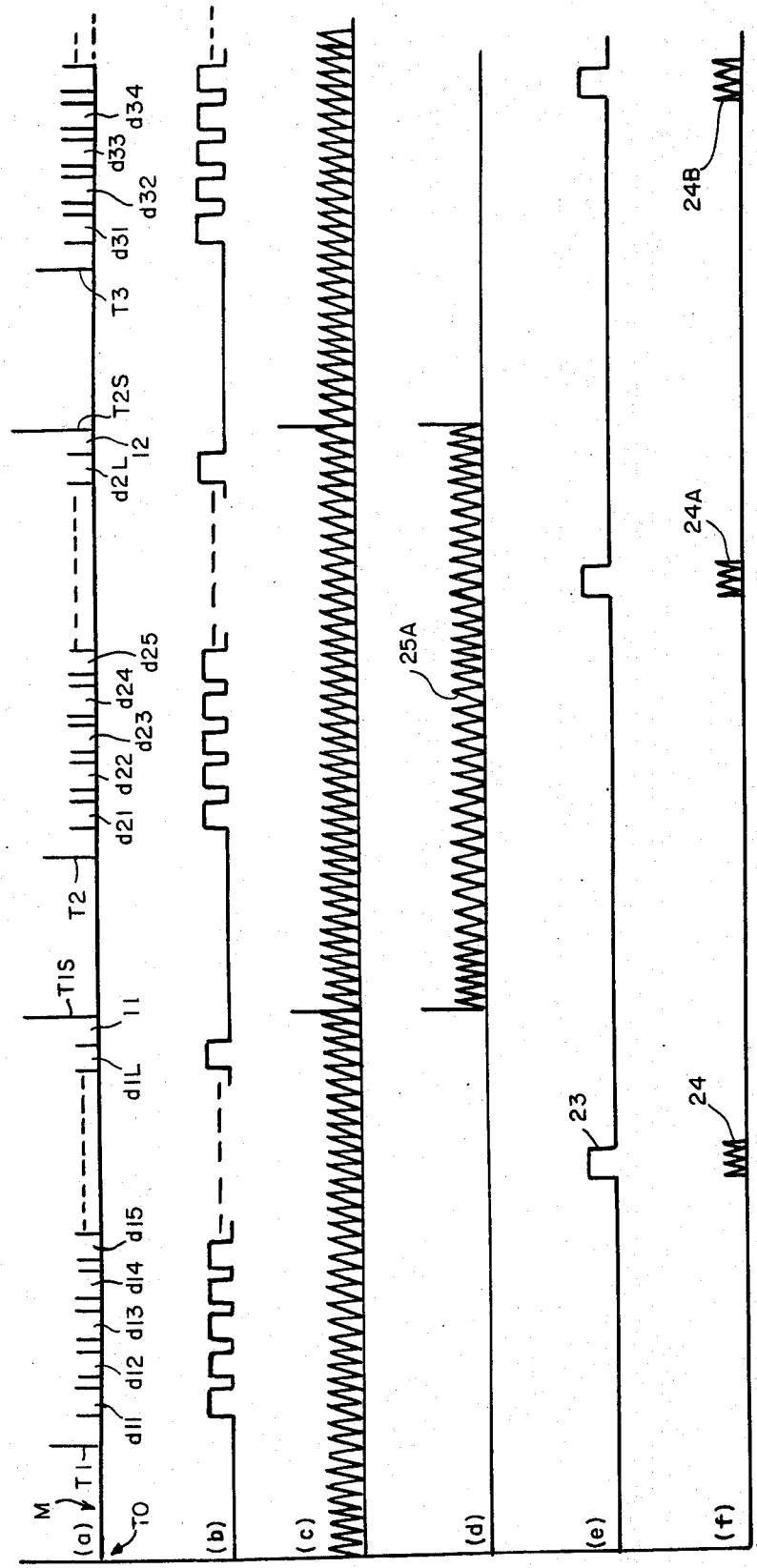

Referring to FIG. 1, the line (a) represents a portion of a magnetic medium M with the position T0 indicating the resting position for a RECORD/READ head (not shown) for use with such magnetic medium. The medium may be a drum or a tape, for example. When a repertory button is depressed, a motor starts to run, as discussed in more detail below. The motor and its associated mechanism are designed so that the magnetic medium reaches a constant speed before the R/R head reaches the position T1. The position interval $d11$ represents a position pre-assigned on the magnetic medium by appropriate means discussed below for the storage of information representing the first digit of a first telephone number controlled by a first repertory button (not shown). Position intervals $d12$, $d13$, $d14$ . . . etc. represent, respectively, pre-assigned positions for the storage of information representing the first digits of each of the second, third, fourth . . . etc. telephone numbers controlled by the second, third, fourth . . . etc. repertory buttons (not shown) until the position $d1L$ which is pre-assigned for the first digit of the last telephone number controlled by the last repertory button. After a short interval 11 the position T1S represents a point at which the R/R head stops to wait for the recordal of the second telephone digit of each number during the recording or the finishing of DC impulses representing the first digit during calling. T2, T3 . . . etc. are positions upon the magnetic medium when the medium again reaches its constant speed after each short stop T1S, T2S . . . etc. Position $d21$ represents a pre-assigned position for recording the second digit of the same first telephone number as controlled by the first repertory button. The positions $d22$, $d23$, $d24$ . . . etc. represent, respectively, pre-assigned positions for recording the second digits of the same second, third, fourth . . . etc. telephone numbers in the same order in succession as above as controlled by the second, third, fourth . . . etc. repertory buttons until $d2L$ which represents the position for the second digit of the same last telephone number controlled by the last repertory button. After a short interval 12, the R/R head reaches a second stop position T2S. Positions $d31$, $d32$, $d33$, $d34$ . . . $d3L$ are assigned for the third digits respectively of the same telephone numbers in the same order in succession. Additional spacings and positions are used for fourth digits, fifth digits, and so on, up to the last digits of all telephone numbers. Those positions on the magnetic medium may be controlled by pre-recorded impulse trains on a track as shown in FIG. 1, line (b), corresponding to the above said positions. They may either be controlled by a mechanical position pre-assigning mechanism, as in FIG. 5, as described in more detail below, or other suitable means.

Figure 2:
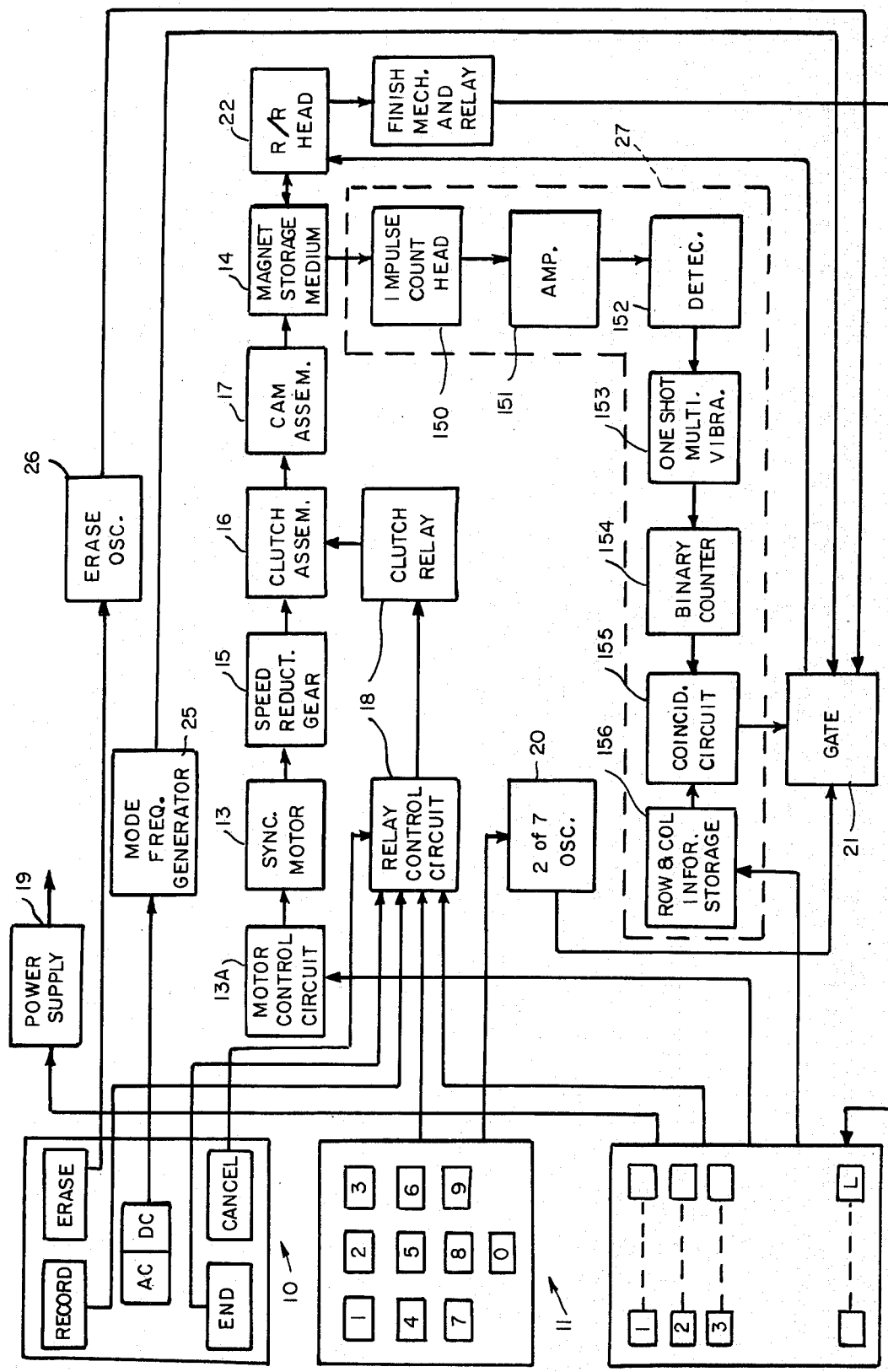
FIG. 2 shows one embodiment of a functional block diagram of the repertory dialer of the invention during recording or erasing operations.

FIG. 2 shows a block diagram of one embodiment of a repertory dialer in accordance with the invention depicting the device in its recording, erasing and cancelling modes. Thus, such dialer has a first plurality of functional buttons 10 labelled as shown for RECORD, END, ERASE, CANCEL and AC-DC operation. Such buttons are suitably mounted on the case (not shown) of the device in a location readily available to a user of the device. A second plurality of numeral buttons 11 corresponding to the numbers 0 through 9 are also mounted in a convenient and readily available location. A third plurality of repertory buttons 12, preferably arranged in rows and columns, are also mounted for convenient and ready access.

The dialer has a synchronous motor 13 driving the magnetic storage medium 14 indirectly through a speed reduction gear set 15, a clutch assembly 16 which may be a frictional type, for example, so that, while the motor 13 runs continuously after being started, the magnetic medium 14 will run intermittently as controlled by appropriate cam assemblies 17 to provide various desired operations. A clutch relay circuit 18, shown in more detail in FIG. 4b, controls the clutch assembly so that in one mode of operation the relay mechanism engages the clutch to prevent the running of the magnetic medium during the running of the motor and in another mode of operation the relay mechanism disengages the clutch to permit the magnetic medium to run at a constant speed.

When a subscriber wants a frequently called telephone number to be recorded, he leaves the telephone handset on its cradle and pushes the RECORD button which is thereupon locked in its operated condition by an conventionally known means. This action opens the circuit branch 18C in the clutch relay circuit 18 of FIG. 4b. The subscriber then pushes one of the repertory buttons 12 which has been designated to correspond to this frequently called telephone number. Such operation actuates power supplier circuitry 19 shown in more detail in FIG. 4c to supply the required power to all circuits. It also closes the motor control circuit 13A in FIG. 4a and starts the motor. The speed reduction gear set 15 reduces the motor speed to a desired value for operation of the clutch assembly 16, cam assemblies 17 and the magnetic storage medium 14. The latter two units are mechanically connected to the output side of the clutch assembly 16. A RECORD/READ head 22 is suitably mounted in operating position relative to the magnetic storage medium. The magnetic medium is held stationary by a hook 18F on the clutch assembly as the clutch relay 18G cannot operate so long as the RECORD button is actuated to open circuit branch 18C in FIG. 4b. When the subscriber pushes any one of the ten numeral buttons 11, a set of contacts is closed temporarily in circuit branch 18A of FIG. 4b and the relay operates once to release the clutch and to move hook 18F to permit the magnetic medium to run T0 to T1S (see FIG. 1(a)) at which latter time the clutch relay 18G opens to permit the hook 18F to move to prevent the magnetic medium from running any further.

When a numeral button 11 corresponding to the first telephone digit is pushed, it also actuates a selected two out of seven oscillators in circuitry 20. The seven different frequencies from such oscillators are used in appropriate combinations to represent the ten numerals as in conventional multi-frequency signalling systems, although it is preferable that the frequencies used in the system of this invention be, in general, higher than those used in conventional multi-frequency operation, while the general principles of operation are the same. The exact design of the frequencies depends upon the dialer capacity. The particular numeral button 11 which has been pushed is held for a short duration until the magnetic medium runs from the position T0 to T1S in FIG. 1a, at which point the medium is stopped by the clutch hook 18F.

Figure 7:
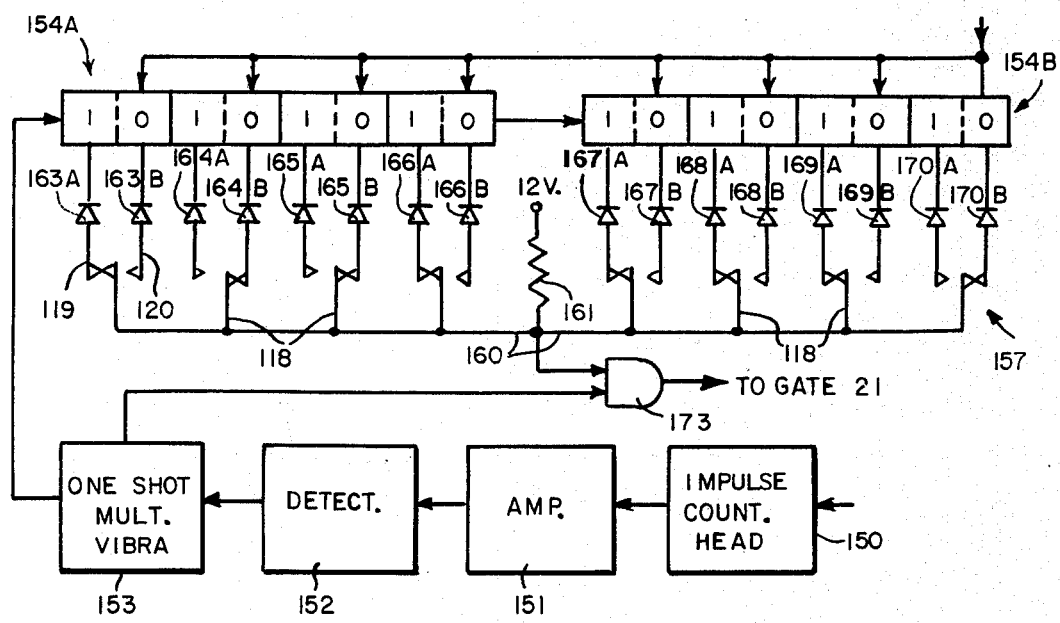
FIG. 7 shows circuitry used to gate the desired signals to or from a R/R head on the magnetic medium during recording, erasing or calling in a system of the invention.
Figure 5:
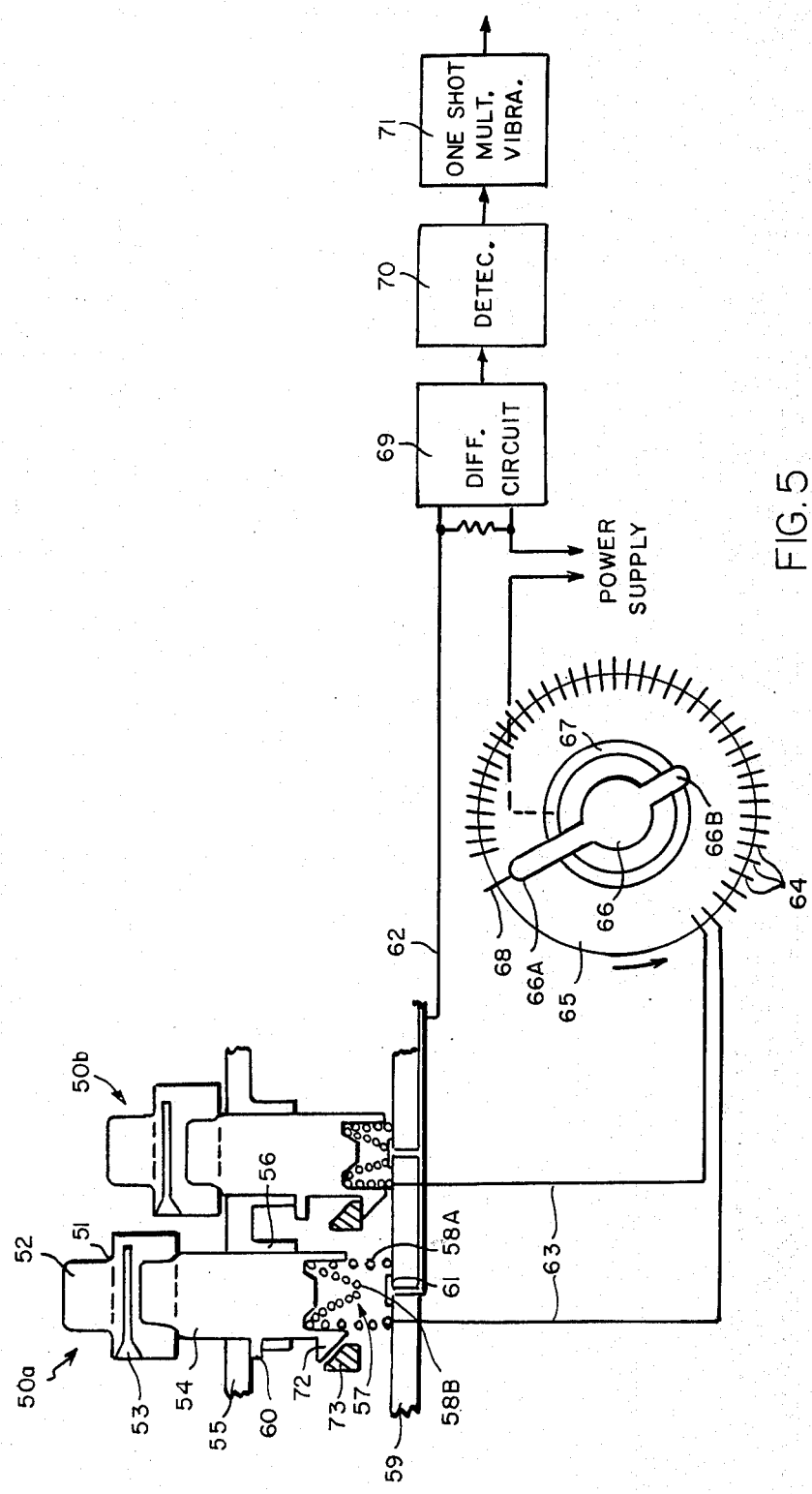
FIG. 5 shows one embodiment of a novel design of repertory buttons and their associated mechanical digit position pre-assigning mechanism and gating circuitry.

Thus, when the numeral button 11 representing the first numeral of the telephone number to be stored is pushed, the two signals of appropriate frequencies selected out of the seven frequencies available are supplied to a gate circuit 21 which gate circuit opens for a short duration only at a time preassigned by a suitable mechanical means such as shown in FIG. 5 or a suitable electronic means such as shown in FIG. 7, or other equivalent methods which may occur to those in the art. FIG. 1c shows a signal representing a combination of the two selected frequencies which signal is present when R/R head 22 is in its operative position relative to the magnetic medium. From position T0 to position T1S, gate circuit 21 opens for a short duration as shown by waveform 23 in FIG. 1(e). Thus, the two selected frequencies are recorded on the magnetic medium only for such short duration as shown by waveform 24 in FIG. 1(f).

After the recording of the first telephone digit at its proper position on the magnetic medium, the subscriber can then push a second numeral button 11 representing the second telephone digit, which operation thereby records the combination of two frequencies representing the second digit in its proper position between T2 and T2S. The subscriber proceeds to push numeral buttons 11 one after one until the appropriate combinations of frequencies representing each numeral thereof have been recorded. Thus, waveform 24A represents the signal waveform of the two frequencies representing the second digit of the telephone number recorded during the time interval T2 to T2S, waveform 24B representing the third digit recorded during interval T3 to T3S, and so on.

Figure 4B:
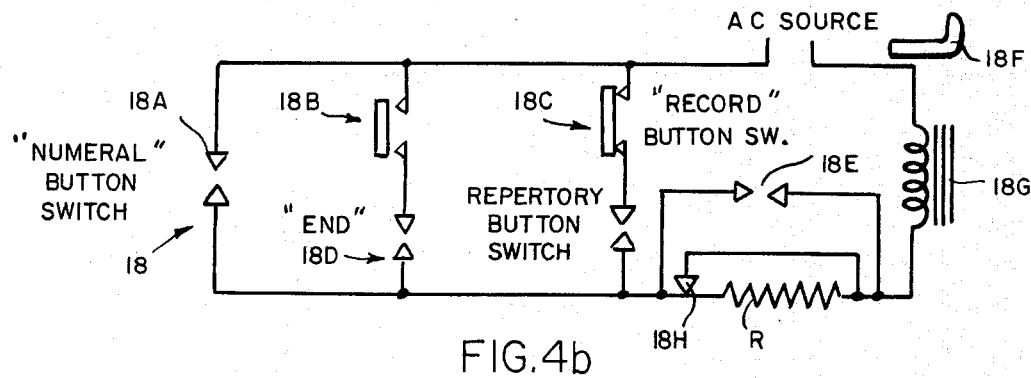
FIG. 4b shows one embodiment of a relay circuit used as a clutch assembly controlling device in the invention.
Figure 4A:
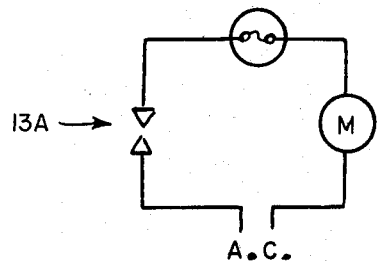
FIG. 4a shows one embodiment of the motor circuit of the invention of FIG. 2.
Figure 4C:
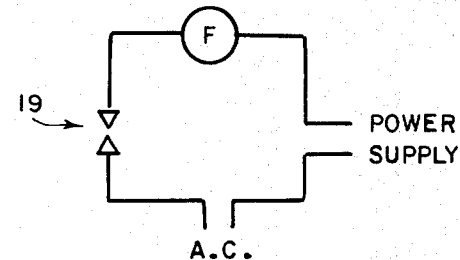
FIG. 4c shows one embodiment of the circuit of the power supply of the invention.

FIG. 4b shows circuitry for ending the recordal of all of the digits. Thus, switch 18B is arranged to close after the first digit has been recorded. When the subscriber pushes the "END" button 18D on button array 10 and holds it for about one second, the clutch relay 18G operates to permit the magnetic medium (in the case of a tape loop) or the R/R head (in the case of a drum or disk) to move relatively rapidly to the end at which point the switch 18B opens the circuit. Meanwhile, an appropriate relay is operated to release the depressed repertory button, as discussed in more detail with reference to FIG. 5 and FIG. 6. The power supply is thereupon removed by the release of the repertory button as shown in FIG. 4c. After finishing the recording, the operator releases the RECORD button.

Another button shown in button array 10 is the two-sided AC-DC button. When the AC side is pushed to its lower position, the DC side is automatically moved to its upper position and vice versa. When the AC side is pushed, no mode frequency signal will be recorded on the magnetic medium but when the DC side is pushed, it operates a mode frequency generator 25 (FIG. 2) which sends a mode frequency signal to the gate 21 as mentioned above. When gate 21 opens, the mode frequency signal is recorded at the same position as the dual frequencies representing a numeral of the telephone number as mentioned above. Thus, FIG. 1(d) shows a situation in which DC operation is to occur and wherein the mode frequency signal 25A is generated so that it is recorded as part of the signal when the gate 21 is opened.

The gate circuit may be mechanically controlled, one such method being explained more fully later in connection with FIG. 5. Alternatively, the gate circuit 21 may be an electronic type, the operation of one such circuit being explained more fully below in connection with FIGS. 6 and 7.

When it is desired to erase the previously recorded telephone digits of a telephone number for the recording of the digits of a new telephone number, an ERASE button of button array 10 is pushed, the desired repertory button from array 12 also being simultaneously pushed. This operation supplies power to all the required circuits and an erasing oscillator 26 emits an erasing frequency signal continuously until gate 21 opens for the erasing frequency to erase the previously recorded information on that desired position only. After finishing the erasing operation the ERASE button is released.

The circuits enclosed by the dashed line 27 in FIG. 2 represent further gate actuation circuitry, the operation of which is explained more fully below in connection with FIG. 7.

Figure 3:
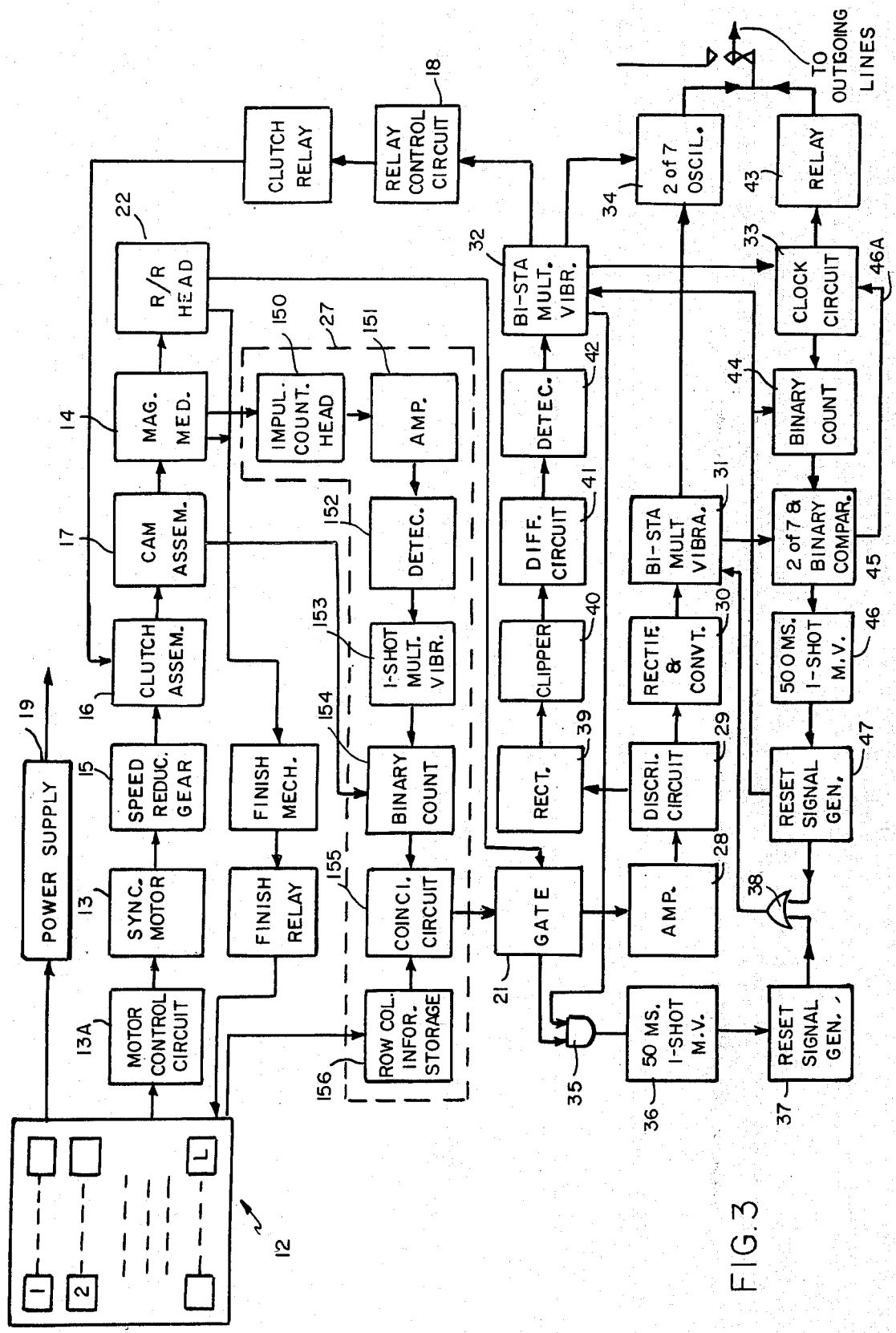
FIG. 3 shows a functional block diagram of the dialer of FIG. 2 during a calling operation.

FIG. 3 shows a functional block diagram of the system in accordance with the invention as shown in the calling mode, circuits corresponding to those in FIG. 2 being designated by the same reference numerals. Thus, when a subscriber wants to make a call on a telephone number which has been pre-recorded in the dialer, he simply picks up the handset and listens for a dialing tone. When the dialing tone is heard he pushes the desired repertory button of button array 12 associated with such number. The dialer system sends the required complete signals, whether in the form of AC or DC, or both combined, to the distant station without the need for further action on the part of the subscriber to complete a call and the repertory button or its associated mechanism is released automatically after the call is completed, as discussed in more detail below.

When the subscriber pushes down the selected repertory button, it closes the power supply circuits of FIG. 4c. The motor starts to run and the clutch relay operates to release the clutch to permit the magnetic medium to run in the case of tape loop or to permit the magnetic medium to rotate and the R/R head to run in the case of drum or disk. The R/R head reads the information in the form of a dual frequency signal from the magnetic medium and such information is supplied to gate 21 until the desired position on the magnetic medium is reached, at which time the gate 21 opens to permit the information to be fed to an amplifier 28. The output from the amplifier is supplied to a discriminator 29 the function of which is to detect the combination of which two of the seven frequencies were stored in the magnetic medium. The detected two frequency signals are again suitably rectified and converted by circuitry 30 to positive spikes (i.e., impulses) for triggering two of seven bi-stable multivibrators 31.

If the system is to be used for sending AC signals to represent the first telephone digit, no mode frequency is detected and an eighth bi-stable multivibrator 32 remains in its reset condition. One of its outputs is fed to a clock circuit 33 to inhibit operation of the latter, while its second output is fed to a "2 out of 7 oscillators" circuit 34 to permit its operation. A third output is fed to an AND circuit 35 which operates only after receiving a signal from the gate 21. The output from the AND circuit is used to trigger a 50 ms. one shot multivibrator (MV) 36 (the duration thereof may be other than 50 ms., although it should be sufficiently long to permit the dual frequency signals to perform the desired switching operation required by the telephone switchboards with which they are being used). Meanwhile, the outputs of the two selected bi-stable multivibrators 31 are used to actuate the appropriate oscillators of circuit 34. A pair of dual frequencies are, thus, sent out to the telephone outgoing lines as shown. After 50 ms, the one shot MV 36 returns to its reset condition and produces a signal at the output of a reset signal generator 37 which output, after passing through OR circuit 38, is fed to all seven bi-stable multivibrators 31 thereby stopping the oscillations thereof.

If the system is to be used for sending DC impulses to represent the second digit, the R/R head 22 also picks up the mode frequency signal which, after being appropriately fed through gate 21, is amplified, fed to discriminator 29 where it is separated from other dual frequency signals. The mode frequency signal is rectified at rectifier 39, clipped at clipper circuit 40 and thereupon fed to a differential circuit 41 and a detector 42, the output of which actuates the eighth bi-stable multivibrator 32. One output from the latter circuit is used to open the contact 18H in clutch relay circuit 18 (FIG. 4b) thereby to insert a resistor R in series with the relay coil to reduce the current therethrough and, hence, releases the relay so that the magnetic medium is prevented from running. A second output from multivibrator 32 is sent to the two out of seven oscillators circuit 34 to prevent their operation. A third output thereof is sent to the clock circuit 33 to start its generation of impulses which operate an output relay 43 to emit standard impulses to the telephone outgoing lines. The output of clock circuit 33 is also fed to a binary counter 44 which in turn is connected to a two out of seven and binary comparator 45 where it is compared with signals received from the seven bi-stable multivibrators 31. When a coincidence occurs, an inhibiting signal 46A is fed back to the clock circuit to prevent any further generation of clock impulses. Simultaneously a signal is fed to trigger a 500 ms one shot multivibrator 46. At the end of 500 ms (the time required for a digit interval for DC operation) one shot MV returns to its reset condition and feeds a signal to reset signal generator 47, which generates a reset signal. This reset signal triggers OR circuit 38 thereby sending reset signals to all eight multivibrators 31, the reset signal from generator 47 also being fed to binary counter 44. The clutch relay thereupon operates again and releases the magnetic medium (or the R/R head) to permit it to continue to run for decoding operation so that it can emit the next telephone digit, and so on, until the finish of the decoding operation. The repertory button is then released automatically by an appropriate finish relay, after the magnetic medium and the R/R head are returned to their resting or start positions. The circuits from the output of the gate 21 to the outgoing telephone lines are explained more fully with reference to FIG. 8.

During the dialer operation a pair of conventional telephone cutout contacts (not shown) may be used, which cutout operation is actuated either by the magnetic medium in the case of tape loop or by the R/R head in the case of a drum or disk, so that the dialing clicks will not be heard.

When it is desired to cancel a call during a DC mode of operation, a CANCEL button (see FIGS. 2 and 4b) can be actuated by the subscriber. The contact 18E of this button shunts the resistor R in FIG. 4b and operates the clutch relay so that the magnetic medium and the R/R head will run quickly to the end. The call will be cancelled by placing the handset back on the cradle.

FIG. 5 shows a novel design of the repertory button of button array 12 and a mechanical means for pre-assigning the positions for all first digits in sequence, as well as all other digits in the same sequence. The mechanical means shown therein is suitable for use with magnetic drums or disks as the shaft shown therein and discussed below on the pre-assigning disk may be used for a drum or a disk.

FIG. 5 shows vertical cross-section views of two repertory buttons 50, one button 50a in its normal non-operated position and another button 50b in its operated, or depressed, position. Although only two buttons are shown in the drawing it is understood that dozens, or hundreds, of similar repertory buttons may be used and may preferably be arranged in suitable rows and columns, as shown diagrammatically in button array 12 of FIG. 2.

Each repertory button has a transparent cap portion 51, a transparent top 52 thereof and a slot 53 used for the subscriber to insert the name of a subscriber of a frequently called telephone number. The lower part of cap 51 has a square opening to fit upon the head of the button body 54 slidably mounted in an aperture in the top cover 55 of the dialer and guided by slides 56 formed under the cover 55. The lower part of the body 54 has a conical space 57 used to house a spring 58. The spring has several turns in its outer portion 58A and several turns in its inner portion 58B and rests on a bottom plate 59. Normally the action of the spring 58 raises the button 50 upward until a stop member 60 mounted thereon comes into contact with the underside of the cover 55. Bottom plate 59 is in the form of a printed circuit board, with one circular conducting disk 61 under the central portion of each button. All circular conducting disks 61 are connected together electrically and are connected to a lead 62. Each spring 58 is connected individually to one of a plurality of separate leads 63, each of which is connected to a separate one of a plurality of metallic strips 64. A fixedly mounted pre-assigning disk 65 is made of molded insulating material, for example, and metallic strips 64 are molded upon a portion of its periphery in an equally spaced configuration, as shown. The strips 64 occupy the major portion of the periphery. In the central portion of disk 65 there is mounted a rotatable shaft 66, which shaft is connected to a magnetic storage drum or disk (not shown) and has two arms 66A and 66B. The longer arm 66A has a needle-like contact 68 which contacts the strips 64 in sequence when the shaft 66 rotates. The shorter arm 66B continuously engages a conducting ring 67 as the shaft 66 rotates within the fixed pre-assigning disk 65. When the magnetic medium is at its reset position, the needle-like contact 68 rests at the position shown in FIG. 5, out of conact with any of the metallic strips 64. After the clutch relay releases the clutch assembly, the magnetic drum or disk rotates together with shaft 66, the system being designed so that the shaft 66 reaches substantially constant speed before contact 68 contacts the first metallic strip 64. When any one of repertory buttons 50 of button array 12 is depressed, the inner portion 58B of the corresponding spring touches the corresponding circular conducting disk 61 and a circuit is completed temporarily when the shaft 66 rotates to bring the needle-like contact 68 into contact with the particular metallic strip 64 which is connected to the outer portion 58A of that particular spring 58 under the depressed button. The completion of the circuit produces a signal at differential circuit 69 and its output is detected at detector 70 to trigger one shot multivibrator 71 which is used as a gate during recording, erasing or calling.

The circuitry shown in FIG. 5 eliminates any undesired signal which may be generated by the sweeping contact from being applied to the R/R head and also provides a more uniform length for the gating signals.

After a repertory button 50 is depressed, it must be retained at its lower position. Such action is accomplished by the use of a wedge portion 72 formed at the lower end button body 54. An extended and fixedly mounted bar member 73 engages each of the wedge portions 72 of all buttons in a single column, and a plurality of parallel mounted bar members 73 are used to accommodate the total number of the columns of the dialer. Bar members 73 are mechanically attached together to form a cross-bar net, which net is appropriately mounted so as to slide horizontally in its support so that when any one of the repertory buttons 50 is depressed, its corresponding wedge portion 72 pushes the net aside temporarily and subsequently engages the underside of its corresponding member 73 so that the button is thereby locked in a depressed condition.

When the bar net is temporarily moved to one side it operates a switch (not shown) which starts all of the operations as described in the former paragraphs. At the end of recording or calling, a finishing relay as shown in FIGS. 2 and 3 is used to move the net to one side temporarily thereby freeing the depressed repertory button, such relay also opening the switch, above mentioned, to stop all operations.

FIGS. 6, 6a, 6b, 6c and 6d show another novel design of repertory buttons and its associated memory mechanism. The design shown therein may be used, for example, with a magnetic tape loop in cooperation with an electronic method of pre-assigning positions for all first digits, all second digits, etc., of all telephone numbers in sequence as in FIG. 1b.

FIG. 6 shows a side view of two exemplary repertory buttons 80 of button array 12, one button 80A being in its normal non-operated position and the other button 80B being in its operated, or depressed, position. An additional view of the operated button is shown in FIG. 6A. Although only two buttons are shown in the drawings it should be understood that dozens, or hundreds, of similar repertory buttons may be used, preferably arranged in rows and columns.

Each repertory button has a transparent cap 81, a transparent top 82, a slot 83 and a square body 84 as discussed above with reference to FIG. 5. The body 84 is slidably mounted in an aperture of the top cover 85 of the dialer. Under the lower part of the body 84 there are two plates 86 and 87. Plate 86 has a hole 88 in its center and plate 87 has a hole 89 in its lower portion. A first cable 90A passes through all of the holes 88 of all repertory buttons in the same column and another cable 90B passes through all the holes 89 of all repertory buttons in the same row. Therefore, each button is kept normally at its upper position by the two cables 90A and 90B arranged in cross directions. Thus, there are as many cables 90B in a transverse direction as the number of rows of buttons and there are as many cables 90A in the longitudinal direction as the number of columns of buttons. Adjacent to each plate 86 there are a pair of vertically erected plates 91 formed upon a middle frame plate 93. Adjacent to each plate 87 there are a pair of vertically erected plates 92 also formed upon frame 93. The heights and the positions of plates 91 and 92 are such that when any repertory button is depressed to its lower position, the holes 88 and 89 in cooperation with plates 91 and 92 deflect their associated cables 90A and 90B. One end of cable 90B is fixed on a side plate 94 of the dialer while the other end thereof passes over a pulley 95 and is attached to a selector member 96 which has a body 97 and an arm 98. When the cable 90B is deflected it pulls the body 97 upward so that the arm 98 moves upward to engage a set of cables 100. The body 97 may be in a form of square slidably mounted in its holder 101.

The holder 101 is also shown in its top view in FIG. 6b. It has a square aperture 102 for each selector 96 and has integrally formed upright plates 103 for mounting the pulleys 95. It has also appropriate slots to engage the narrower parts 99 of each selector 96. A tail member 106 under each selector 96 has an opening in which a tension spring 107 is attached, the spring acting to pull the selector 96 to its lower position, which position is limited by an angle member 108 fixedly attached to holder 101. The other end of the spring 107 is attached to a frame member 109.

The selector 96 has five positions 110a, 110b, 110c, 110d and 110e, for example, when the dialer is designed for a number of rows of repertory buttons between 9 to 16. If the number of rows of repertory buttons designed is between 5 to 8, then only four positions from 110a through 110d are required. When the selector 96 is mounted in the dialer, the region 110a thereof faces first cable 100A and similarly region 110b faces a second cable 100B, and so on. The positions 110b to 110e in the example of FIG. 6c are shown with dotted lines. Thus, the material of the arm 98 at any of those four regions of any selector 96 may be cut out as required, while the body region 110a is retained in solid form. A cable frame 111 has five transverse slots 112, one for each cable 100, as shown in FIG. 6. It has also longitudinal slots 113, as shown in FIG. 6d, whose number is equal to the number of selectors 96, all mounted in parallel and is equal also to the number of rows of repertory buttons. Each cable 100 is fixed at one end upon a side plate (not shown) of the dialer, but is pulled straight by a spring 114 hooked to another side plate 115 of the dialer. When any button is depressed its associated row cable 90B is deflected temporarily, thereby pulling upward a selector 96 and causing portion 110a of selector 96 to enter slot 113 to deflect, in turn, the associated cable 100A. This action pulls an angle piece 116 fixedly attached to the cable 100A and slidable in its guide 117 so as to push a central spring 118 to contact a right spring 119 and open the contact from a left spring 120 of the contact member shown in FIG. 6d. When the subscriber raises his finger, spring 107 (FIG. 6) pulls the cable 90B downward thereby raising the button to its upper position. Meanwhile, the spring 114 (FIG. 6d) moves the angle piece 116 back to its original position. However, the central spring 118 is kept on its right position by a retaining member 121. The closure of this pair of contacts is used to start the motor circuit and others as described above. The remaining cables 100B through 100E are either deflected or remain undeflected depending on which of the body regions 110b through 110e are cut out, as described below.

central springs 118 are moved into contact with the right side springs 119. The associated angle pieces 116 push the associated central springs 118 into locked positions via associated retaining members 121, which have oblique fingers 122 to prevent the central springs 118 from returning to contact with left side springs 120 when the angle pieces 116 return to the left. The retaining members 121 are normally pulled downward by springs 123 and are limited in their downward motion by a bar 124 which is common to all five retaining members 121 in this instance. Thus, information identifying the row in which a depressed repertory button is located can be transferred and stored in the four sets of spring contacts 118, 119 and 120 associated therewith. A similar set of mechanisms can be used to store the information identifying the column in which the actuated repertory button is located, such mechanisms being substantially the same as that described above and, therefore, for purposes of clarity not shown specifically in FIG. 6. After recording, erasing or calling, either the R/R head or the tape loop reaches its end position and an appropriate mechanism for closing the circuit of "finish" relay coil 125 is actuated so as to pull the relay armature 126 upwardly. Such action lifts the five retaining members 121 so as to free the locked central springs 118, the power supply also being appropriately disabled so that everything returns to its normal non-actuated condition.

FIG. 7 shows a gating circuit and describes in more detail the functional block diagrams as represented by the dashed lines 27 of FIGS. 2 and 3, including the impulse counting head 150, amplifier 151, detector 152, one shot multivibrator 153, binary counters 154, coincidence circuit 155 and row and column information storage device 156, all of which feed the gate 21 in FIGS. 2 and 3. Let it be supposed that a train of impulses have been pre-recorded in a track adjacent to the previously described R/R track in the form shown in FIG. 1b. When that portion of the magnetic storage medium passes under the impulse counting head 150, voltages are induced, amplified in an amplifier 151, then rectified by a detector 152 to cut out the lower

TABLE I

| Row No. or Column No. | 110b | 110c | 110d | 110e | Row No. or Column No. | 110b | 110c | 110d | 110e |
|---|---|---|---|---|---|---|---|---|---|
| 1 | x | x | x | x | 9 | x | x | x | |
| 2 | | x | x | x | 10 | | x | x | |
| 3 | x | | x | x | 11 | x | | x | |
| 4 | | | x | x | 12 | | | x | |
| 5 | x | x | | x | 13 | x | x | | |
| 6 | | x | | x | 14 | | x | | |
| 7 | x | | | x | 15 | x | | | |
| 8 | | | | x | 16 | | | | |

Note:
In the above table where marked with x the piece is cut out.

Table I above shows, as one example thereof, which region or regions 110b, 110c, 110d, 110e of the selectors 96 of different rows (or columns) should be cut out, such regions being marked with an x as shown. Thus, a selector 96 used to control a seventh row (or column) can be discussed as an example. In such case, regions 110b and 110e are cut out and in operation their associated cables 100B and 100E are not deflected and their associated central springs 118 are left to contact the left side springs 120. Regions 110c and 110d are solid, so that their associated cables 100C and 100D are deflected temporarily and the associated parts thereof for the purpose of triggering the one shot multivibrator 153, the output of which is fed to a pair of binary counters 154. If the dialer has 16 rows and 16 columns, for a total of 256 repertory buttons, for instance, then the counters consist of eight flip-flops 154 (FIG. 7). Four flip-flops 154A are used to count the number of rows from 1 to 16. After every 16 counts the four flip-flops 154B count the number of columns from 1 to 16, the diode matrix 157 as shown in FIG. 7 being used therewith. A lead 160 is connected to a positive voltage source of 12 volts, for example, through a resistor 161 which is in turn connected to all central spring members 118 in FIGS. 6 and 7. Each adjacent pair of diodes 163A and 163B, 164A and 164B . . . 170A and 170B have one end of one of the diodes 163A, 164A . . . 170A connected to the "one" side of the eight flip-flops, respectively, and have one end of diodes 163B, 164B . . . 170B connected to the "zero" side of eight flip-flops, respectively. The other ends of the diodes are connected to each of the spring members 119 and 120, respectively, i.e., one pair of diodes corresponding to one pair of spring members 119 and 120, respectively, controlled by cables 100 for the rows and similar cables for the columns.

When any repertory button on a row and a column is depressed, its row and column information is stored in spring member contacts 118, 119 and 120 so that the appropriate diodes are connected to the lead 160 to represent the number of the row and column of that selected repertory button. When the counter counts the number of impulses from the impulse counting head equivalent to the row number and column number of the selected repertory button, a coincidence occurs and the voltage on lead 160 rises to 12 volts. An AND circuit 173 operates to provide a gating signal to open the gate 21 to permit the appropriate oscillating frequencies to reach the R/R head, or the voltage pickup from the R/R head to reach an output amplifier, depending on the mode of operation being used. The spring contacts, as set in the example shown in FIG. 7, represent the seventh row and ninth column, which means that the 105th button in a 16 × 16 array of 256 buttons is depressed. The flip-flop chains of the counter 154 are reset after the recording, erasing or calling operations at the end of each digit by an appropriate mechanical or electronic means of conventional design.

Figure 8:
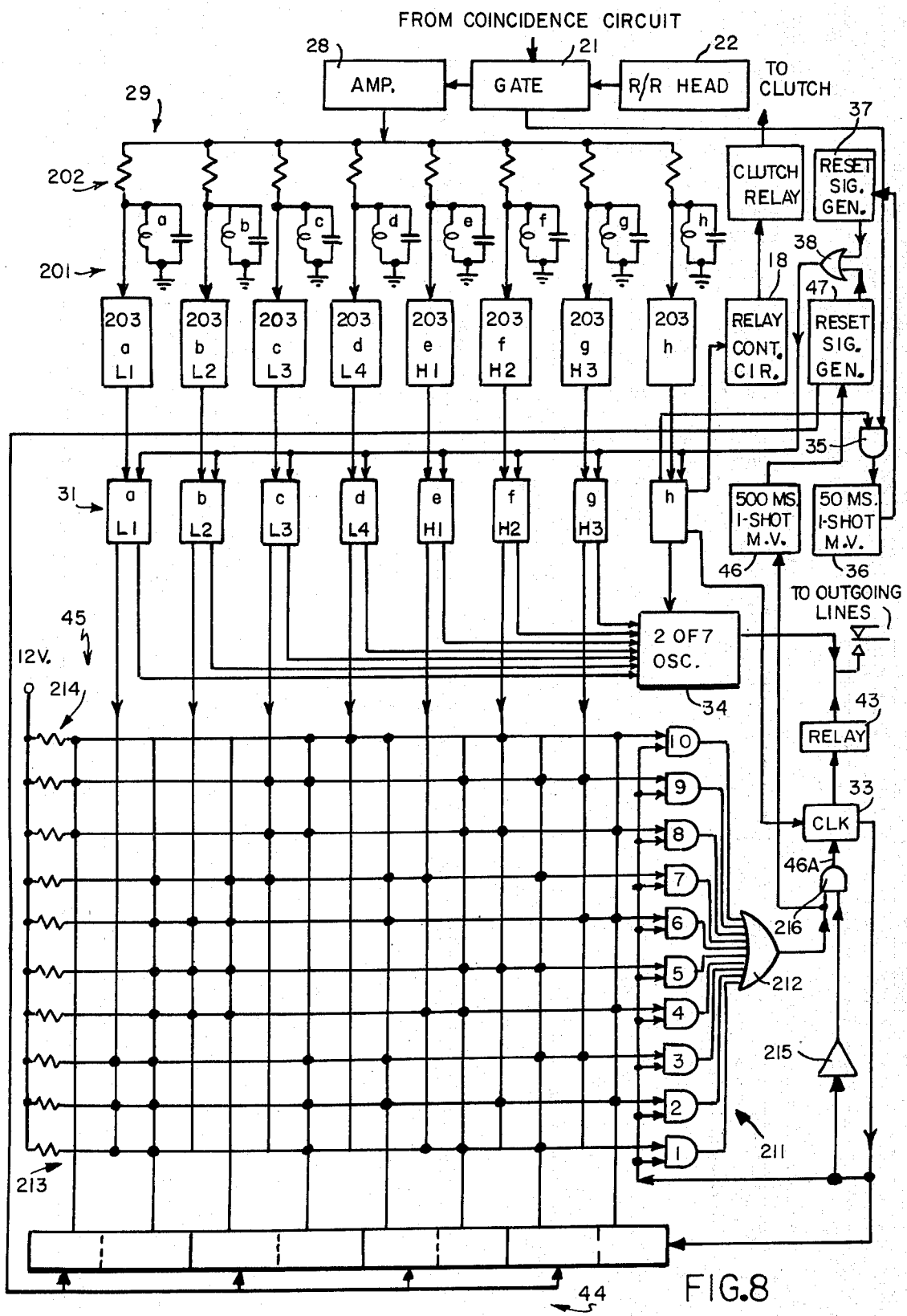
FIG. 8 shows circuitry used to convert recorded dual frequencies to AC signal and DC signal mode operation.

FIG. 8 shows the output circuit which explains in more detail the functional block diagrams of the circuits from the amplifier 28, at the output of gate 21 to telephone outgoing lines during a calling operation of FIG. 3. When the gate 21 passes the two particular frequencies representing one digit, and the mode frequency, if any, for a short duration, the signals are amplified and fed to the discriminator 29, which consists of eight tuned tank circuits 201a . . . 201h connected in parallel through the eight resistors 202. Seven tank circuits are tuned to the seven different frequencies, respectively, used during recording, with eighth tank circuit 201h tuned to the mode frequency. If the particular telephone digit is an AC signal, only two frequencies are contained in the output from the gate 21. When these two frequencies are fed to the seven tank circuits simultaneously, only those two tank circuits which are in resonance with the incoming frequencies produce output signals. The output signals are fed to the two sets of seven conventional processing circuits 203a through 203g consisting of amplifiers to further increase their amplitudes, full-wave rectifiers and clippers to convert them to two DC impulses, differential circuits and detectors to obtain two positive spikes for triggering two of seven bi-stable multivibrators 31a through 31g. The seven bi-stable multivibrators are so designed that when reset before operation there are provided no useful outputs. When two of them are triggered, their outputs will be both sent to the "2 out of 7 oscillator" circuitry 34 and to the "2 out of 7 to binary comparator" circuitry 45. At this time for AC operation there is no mode frequency recorded in that position and the eighth bi-stable multivibrator 31h (which is designated by 32 in FIG. 3), controlled by the mode frequency, produces no output, i.e., it is in the reset state. Bi-stable multivibrator 31h is so designed that, during the reset state, its output permits the appropriate two out of seven oscillator circuits 34 to oscillate while simultaneously providing an inhibit signal to the clock 33 to prevent its operation. Therefore, dual frequencies controlled by the two appropriately triggered bi-stable multivibrators 31 are sent to the outgoing telephone lines.

When the gate 21 opens for a short duration it also sends a signal to the AND circuit 35, which also receives a signal from the eighth mode frequency multivibrator 31h in the reset state. The AND circuit 35 delivers its output to trigger a 50 ms one shot multivibrator 36. After 50 milliseconds multivibrator 36 returns to its normal condition, a reset signal is generated and fed through an OR circuit 38 to reset the seven multivibrators from 31a to 31g. When multivibrator 31h is in its reset state, it has no effect upon the clutch relay circuit, so that the relay is operated as in FIG. 4b by the closing contacts of any depressed repertory button. The magnetic medium keeps on running for the next digit.

If the dialer is required to send DC impulses in the next digit so that the particular recorded position therefor contains the mode frequency as well as the dual frequencies, all three frequency signals pass the gate 21. When the mode frequency reaches its tank circuit 201h it is in the resonant state and is converted to a DC impulse which is reshaped to trigger the multivibrator 31h to a set state. Multivibrator 31h feeds its output to inhibit the operation of 2 out of 7 oscillator 34 and to start the operation of clock circuit 33, which continuously generates DC impulses to the relay 43 which sends out standard telephone impulses to the outgoing telephone lines. Multivibrator 31h is in the set state and its output controls a set of contacts (see FIG. 4b) either through a relay (not shown) or through an electronic circuit (not shown) so that the resistor R is inserted into the clutch relay circuit to hold the magnetic medium until ready for the scanning of the next digit. At the same time, the dual frequencies picked up by the R/R head pass the gate 21 and, thence, ultimately through the circuits shown in FIG. 8 where they ultimately produce signals to trigger one of four bi-stable multivibrators 31a to 31d identified by the legends L1, L2, L3 and L4 and one of the three bi-stable multivibrators 31e to 31g identified by the legends H1, H2 and H3. The outputs thereof are fed to the two out of seven to binary comparator circuitry 45. The latter consists of a set of binary counters 44 (four flip-flops, for example), ten AND circuits 211 and one OR circuit 212, together with a diode matrix 213 and ten resistors 214 all connected to a voltage source (e.g., a positive 12 volt source). The ten AND circuits are used to control the impulse numbers from 1 through 10. The diode matrix is connected as shown in FIG. 8 wherein each dot thereof on the crosspoint of two lines diagrammatically represents one diode connected to the two lines.

Thus, if seven impulses are desired, the outputs from L3 and H1 are in the set state, or "ONE" state, while the clock 33 emits impulses continuously from one to six to the binary counter 44. During this time there is always at least one diode from the input lines of AND circuits 211 connected to a "ZERO" side so that there is always current flowing to the multivibrator 31 and the binary flip-flops 44 until the seventh impulse is emitted. At this time the voltage of the input line to AND gate No. 7 has risen to 12 volts, which is equivalent to a "ONE". Now the OR circuit 212 operates and its output is fed to trigger a 500 ms one shot multivibrator 46 while it simultaneously combines with a signal from an inverter 215 to activate the AND circuit 216 to send an inhibit signal 46a to the clock 33 to stop generation of further impulses. Therefore, the dialer sends out the number of impulses according to the signal, i.e., dual frequencies, stored in that particular position representing that particular digit. The use of an inverter assures that the inhibit signal is generated only after the last impulse has been completely sent out to the outgoing telephone lines. At the end of 500 ms the 500 ms one shot multivibrator 46 resets by itself and sends out a signal to a reset signal generator 47. The design of reset generator 47 is the same as the reset signal generator 37 which receives its input from the 50 ms one shot multivibrator 36 when the latter resets by itself after 50 ms of operation. Both reset signal generators emit one spike only at the time when they change from a "set" state to a "reset" state. When either of the reset signal generators 37 and 47 emits a spike to the OR circuit 38, the latter provides a signal to reset all multivibrators 31. The reset signal from reset generator 47 is also sent to the binary counter 44. Alternatively, it is possible to use one reset signal generator instead of two and omit the OR circuit 38. Multivibrator 31h resets and provides a signal to the clutch relay circuit 18 to close the contacts to permit relay operation (see FIG. 4b). The relay releases the clutch to permit the magnetic medium to proceed to the position for emitting signals of the next digits. In this way no time is wasted for operation over time intervals longer than required. The calling will be completed in the shortest possible time and is faster than most previously known dialers and faster than any manual method of dialing.

A different number of impulses, or sinewave signals, instead of different dual frequencies may be used to represent different digits to be recorded in pre-assigned positions. An example of such circuitry is described with reference to FIGS. 9 and 10.

Figure 9:
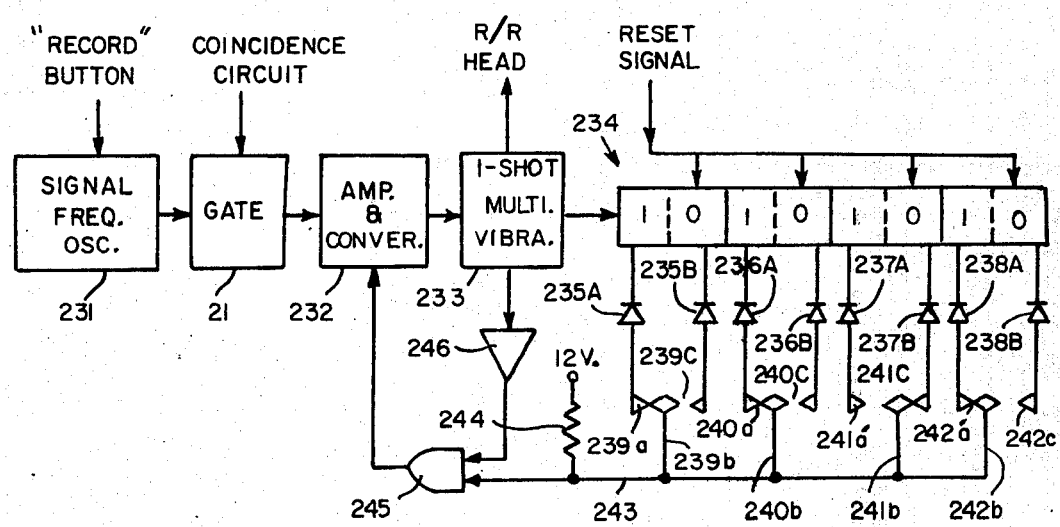
FIG. 9 shows control circuitry used for recording at the pre-assigned position in the magnetic medium a single frequency signal.

In FIG. 9 a signal frequency oscillator 231 oscillates to provide a sinewave or a series of impulses, as described, when the RECORD button of button array 10 is depressed. The oscillating frequency is preferably designed so that each pre-assigned position may record about 12 sinewave cycles or impulses. During recording it follows the same procedure and the dialer operates the same as in the example described above until the gate 21 opens to pass the sinewave or impulse signal which is amplified and converted in component 232 to positive spikes to trigger a one shot multivibrator 233. One of the outputs thereat is sent to the R/R head to be recorded, a second output is sent to trigger a chain or binary counters 234 which counts the number of impulses sent to the R/R head. Eight diodes 235A and 235B, 236A and 236B, 237A and 237B, and 238A and 238B are connected to the "ONE" sides and "ZERO" sides of four flip-flops 234, respectively. The other ends of the diodes are connected to four sets of contacts 239a and 239c . . . 242a and 242c, respectively. The four sets of contacts are controlled by ten numerical buttons as shown in Table 2:

TABLE 2

| Numberical Button No. | Contacts make | | | |
|---|---|---|---|---|
| 1 | 239b & 239c | 240a & 240b | 241a & 241b | 242a & 242b |
| 2 | 239a & 239b | 240b & 240c | '' | '' |
| 3 | 239b & 239c | '' | '' | '' |
| 4 | 239a & 239b | 240a & 240b | 241b & 241c | '' |
| 5 | 239b & 239c | '' | '' | '' |
| 6 | 239a & 239b | 240b & 240c | '' | '' |
| 7 | 239b & 239c | '' | '' | '' |
| 8 | 239a & 239b | 240a & 240b | 241a & 241b | 242b & 242c |
| 9 | 239b & 239c | '' | '' | '' |
| 10 | 239a & 239b | 240b & 240c | '' | '' |

The central lines 239b, 240b, 241b and 242b are all connected together to the line 243, which is connected to a resistor 244 and then to a positive 12 volt voltage source, for example. The one shot multivibrator 233 also sends a third output to an inverter 246. For example, if it is desired to record the digit "4" in the pre-assigned position, then the numerical button 4 is depressed, the four spring contacts from 239 to 242 are set as in FIG. 9. The magnetic medium runs until it reaches the position where it is desired to record the digit "4". A coincidence occurs and the gate 21 is opened for a short time, enough for recording 12 impulses or sinewave signals. Oscillator 231 sends its output to the gate 21 from whence it is amplified and converted to positive spikes to trigger the one shot multivibrator 233 which is designed to return to its reset condition by itself in a time equal to one-half of the sinewave signals. In this way one impulse after another is sent in sequence to the R/R head to be recorded, while they are also simultaneously sent to the counter 234 until four impulses are sent out to be recorded and the counter is set to a binary chain of 1011. The voltage on the line 243 rises to 12 volts, and the AND circuit remains inoperative until the four impulses have been completely recorded, by which time the one shot multivibrator 233 returns to its reset condition. The output from inverter 246 together with the 12 volt signal on line 243 makes the AND circuit 245 operative and sends its output to the amplifier and converter 232 to inhibit the operation thereof so that no more spikes are emitted to trigger the one shot multivibrator 233. After a short duration the gate 21 closes and reset signals are sent in a manner similar to that described in previous paragraphs to reset the binary counter 234. By the above method various digits represented by various numbers of impulses or sinewave signals are recorded in the desired pre-assigned positions for a frequently called telephone number.

Figure 10:
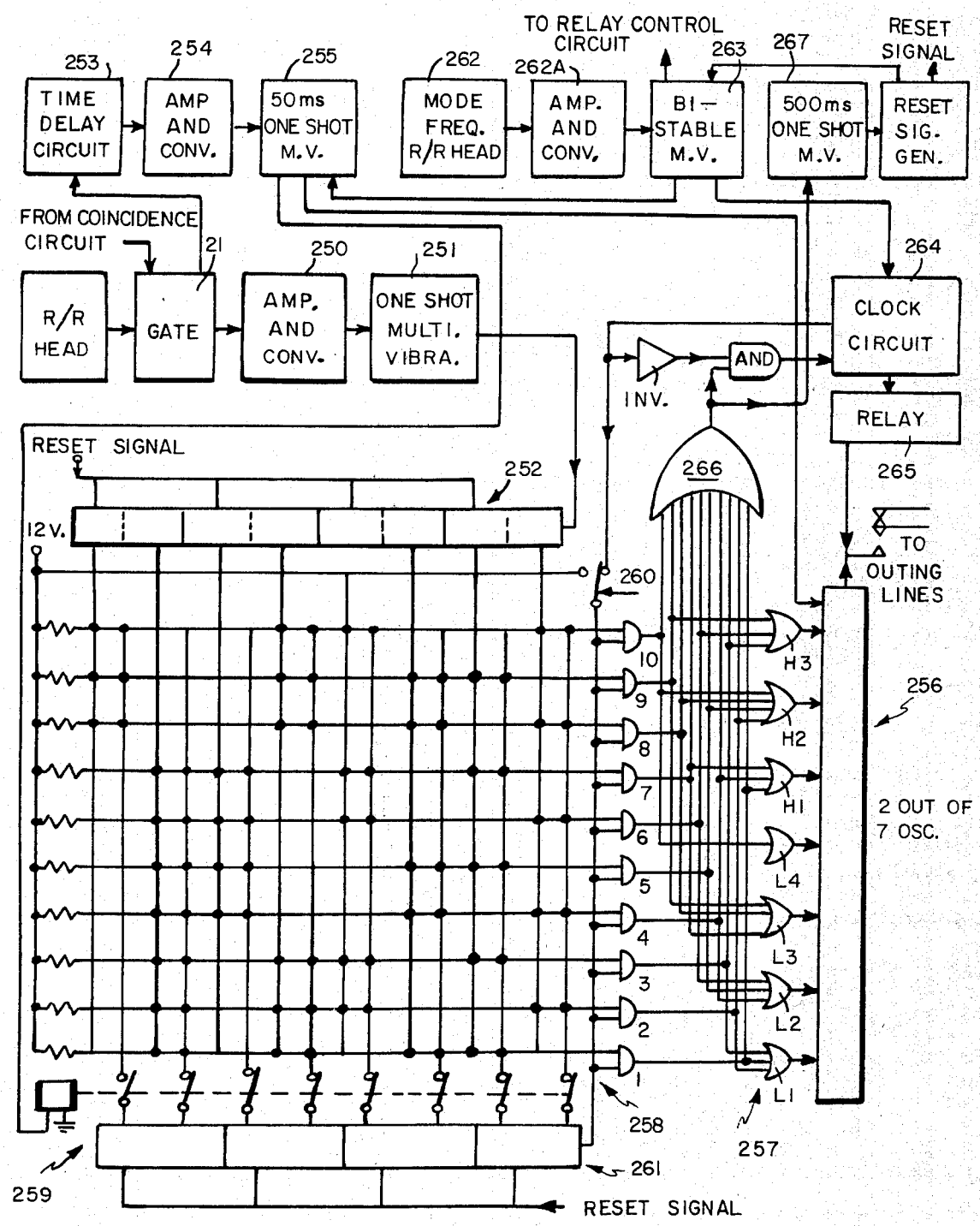
FIG. 10 shows circuitry used for converting impulse signals from the recorded magnetic medium to AC or DC signals for effecting switching operations.

FIG. 10 shows circuits which may be used during calling for converting the number of impulses recorded into desired AC or DC signals to the switchboards. The parts of these circuits which are the same as in FIG. 8 are not shown here for simplicity.

The recorded impulses pass the gate 21 and are amplified and converted in component 250 to positive spikes, the number of which are equal to the number of impulses recorded. The spikes are sent to the one shot multivibrator 251 which emits an impulse for every spike received. The impulses are sent to a binary counter 252 which registers the number of impulses in a binary form.

If AC signals are desired for a particular digit, the gate 21 also provides a signal, when it is opened, to a time delay circuit 253, which delays such signal for a short time until the binary counter 252 has registered the number of impulses. The signal from the gate 21, after being delayed, is amplified and converted in component 254 to trigger a 50 ms one shot multivibrator 255. When the latter is at its reset condition it sends an inhibit signal to 2 out of 7 oscillator circuitry 256 to prevent its operation. During its 50 ms operating time the oscillator circuitry 256 will provide a dual frequency signal. The frequencies are determined by two of seven OR circuits 257. The OR circuits are controlled by one of the ten AND circuits 258. For example, if the binary counter 252 is set to 1010 by five impulses then the line connected to the AND circuit No. 5 rises to 12 volts, for example, while a signal from a 12 volt source enables the AND circuit No. 5 the output of which is fed to OR circuits L2 and H2 so that dual frequencies representing L2 and H2 are sent out. A relay 259 is operated by the signal from 50 ms one shot multivibrator 255 to open the diode matrix circuits from a second binary counter 261 via its eight sets of contacts and its ninth set of contacts 260 to shift the input lines to the ten AND circuits to 12 volts.

If DC signals are desired for the next digit, a separate mode frequency R/R head 262 on an adjacent track picks up the mode frequency to be amplified and converted in component 262A to trigger a bi-stable multivibrator 263 which feeds one output to a clock circuit 264 to start the generation of a clock signal for operating a relay 265 which delivers standard impulses to the outgoing telephone lines. The multivibrator 263 sends a second output to inhibit the operation of 50 ms one shot multivibrator 255 so that the 2 out of 7 oscillator circuits do not operate. The bi-stable multivibrator 263 in its set condition also sends its third output to control the relay circuit in FIG. 4b to stop the running of the magnetic medium during the sending of DC impulses. Meanwhile the relay 259 is inoperative and the eight sets of contacts as well as its contact 260 stay in positions as shown in FIG. 10. The clock sends out impulses to the second binary counter 261 and the outputs of the binary counters are compared with each other. When they match, one AND circuit 285 operates to pass a signal to the OR circuit 266 and then to the clock 264 to stop the further generation of impulses. Meanwhile the second output from the OR circuit 266 sends a signal to trigger a 500 ms one shot multivibrator 267. After a 500 ms, required as the time interval for a DC switching system, the multivibrator 267 resets by itself and sends a signal to trigger a reset signal generator. Its output is sent to the counter 261 and to reset the bi-stable multivibrator 263, thereby starting the running of the magnetic medium again for the decoding of the next telephone digit.

Thus, the above descriptions and drawings of a dialer in accordance with the invention describe systems capable of storing both AC and DC information and of calling automatically to send both AC and DC signals. The circuitry can be simplified if only AC or DC signals are used exclusively during recording and calling.

While the system of the invention described above uses "2 out of 7 frequencies" and "various numbers of impulses" to represent various telephone digits for recording and calling in the specific embodiments described, other techniques, such as "1 out of 10 frequencies" to represent the digits from 1 through 10 binary codes to represent 10 digits, different widths of an impulse to represent 10 digits, and many others, may be used to represent the 10 digits in the recording and calling operations. All such modifications are within the skill of those in the art provided all first digits, all second digits, all third digits, and so on, are recorded in sequence during recording so that there is no need to align the R/R head during calling.

Figure 11:
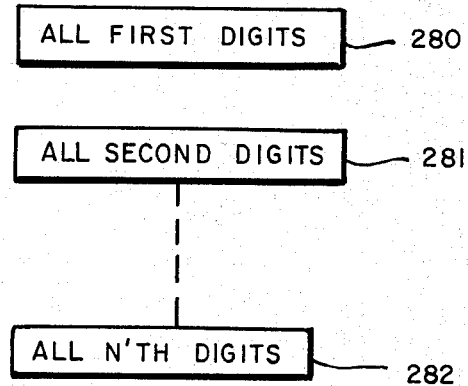
FIGS. 11–14 depict alternative schemes of the invention for storing digits of repertory telephone numbers.

In the recording scheme specifically described above, particularly with reference to FIG. 1, all corresponding digits of all repertory telephone numbers which are stored in the storage medium are arranged together to be stored to form corresponding groups, such as depicted diagrammatically in FIG. 11. Thus, all first digits of all telephone numbers are stored together in sequence to form group 280, all second digits are stored together to form group 281, and so on, with all final digits, or N'th digits of telephone numbers having N digits, are stored together to form group 282.

Figure 12:
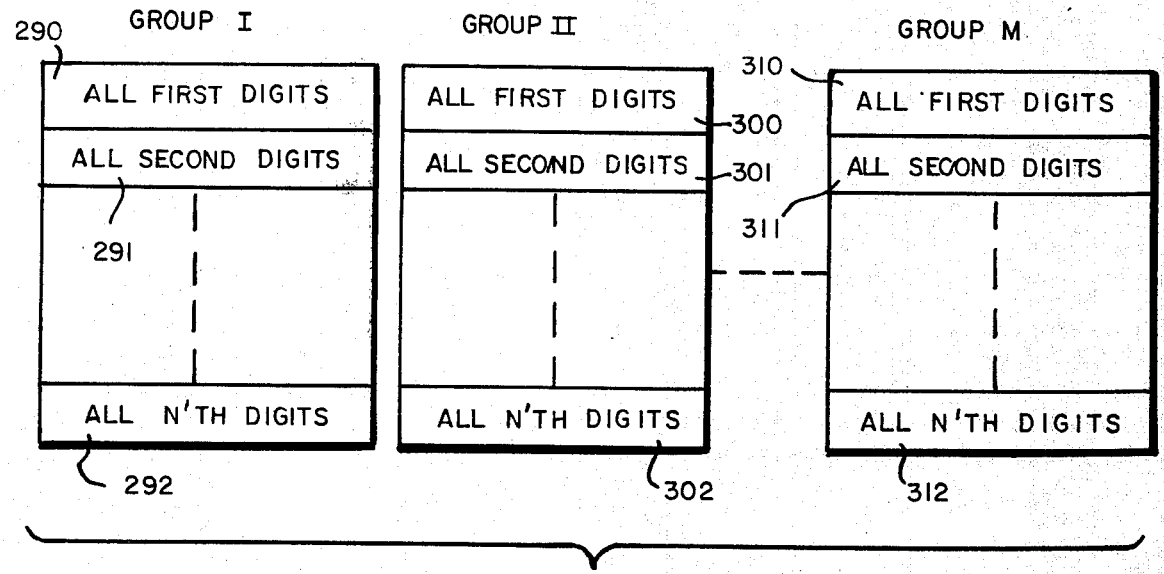

However, the signals used to represent all digits of all repertory telephone numbers may be arranged in alternative schemes within the spirit and scope of the invention. For example, one such alternative scheme is depicted diagramatically in FIG. 12. As seen therein, the repertory telephone numbers may be arranged into two or more separate groups, each group of repertory telephone numbers containing sub-groups of the type shown in FIG. 11. Thus, a first group of telephone numbers, designated as Group I in FIG. 12 is arranged so that all first digits of such group of numbers are stored together in sub-group 290, all second digits of such group of numbers are stored together as sub-group 291, and so on, until all N'th digits are stored together as sub-group 292. The digits of a second group of repertory telephone numbers, designated as Group II, are similarly stored as shown by sub-groups 300, 301 and 302. In accordance with Scheme 2 of FIG. 12, the repertory telephone numbers may be stored in more than two groups each group being similarly arranged as shown by Group M and its sub-groups 310, 311 and 312. During operation of the system with respect to Scheme 2, that is, during the recording, erasing or calling operations, the selection of a desired group may be performed by appropriate electrical circuitry and the record/read head, or a suitably selected record/read head if more than one such head is used, is arranged to scan the selected group where the digits of the desired telephone number are positioned.

Figure 13:
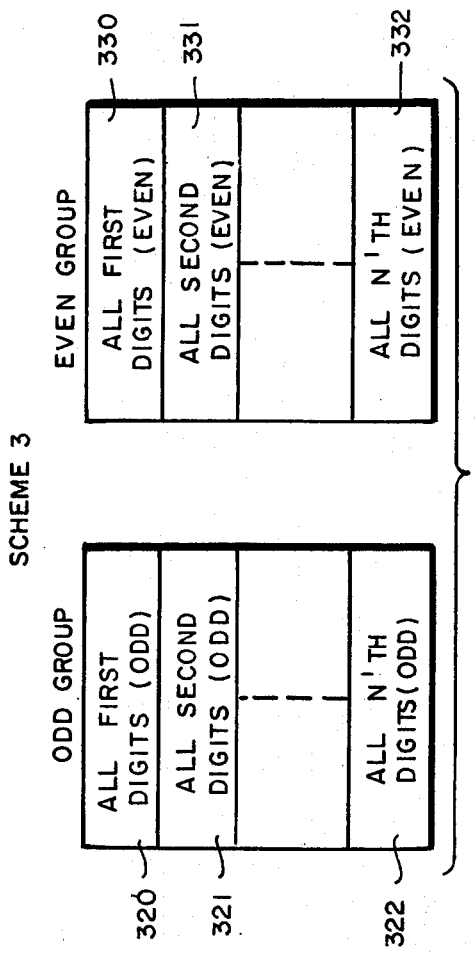

Another alternative storage arrangement is depicted in FIG. 13 wherein all digits of all odd repertory button numbers representing telephone numbers are formed in one group and all digits of all even repertory button numbers representing telephone numbers are formed in another group. Then all digits in the odd number group are in turn arranged so that all first digits are stored together as a sub-group, such as sub-group 320, all second digits are stored together as sub-group 321, and so on, with all N'th digits stored as sub-group 322. Similarly all digits in the even number group are stored in sub-groups, designated in FIG. 13 by sub-groups 330, 331 and 332.

In such a scheme, if the numbers are stored, for example, on a magnetic tape, a disk or a drum the odd group may be stored on the upper surface of the tape or disk, or on a specified part of the drum while the even group may be stored on the lower surface of the tape or disk, or on another part of the drum. Two sets of record/read heads may be used. Such an arrangement can either reduce the tape length or disk size or increase the dialer capacity. Alternatively, the odd group may be positioned on one track of a magnetic medium and the even numbers on an adjacent track, in which case it is possible to use a single record/read head with appropriate electromechanical control for scanning the desired track to obtain the desired digits from either group.

Figure 14:
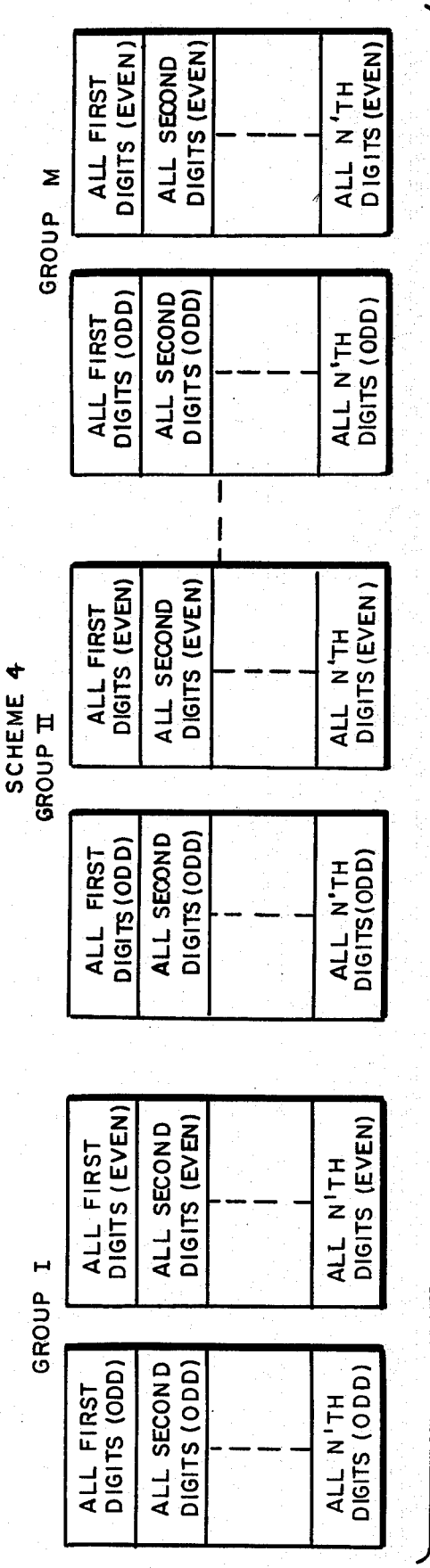

An extension of the concept of FIG. 13 is shown in FIG. 14 wherein the odd and even groups of FIG. 13 are further separated in associated groups, designated as Group I, Group II . . . Group M. Each group is in turn made up of sub-groups of odd and even numbers in sequence in the manner discussed with reference to FIG. 13.

Other arrangements of the digits of all repertory telephone numbers may occur to those skilled in the art within the spirit and scope of the invention, the appropriate electrical and mechanical means required for storing, erasing and retrieving the stored data being within the skill of the art.

Further, while the above description has been presented to describe the system of the invention for use in storing telephone numbers on a continuous magnetic storage medium, such as a tape, disk or drum, other storage means may also be used.

Thus, the system may utilize discrete storage media such as magnetic cores, thin-film devices, transistors, ferroelectric storage cells, diode-capacitor units, or others that may occur to those in the art, appropriate modification of the electronic and mechanical means for storing, erasing and retrieving the stored data being within the skill of those in the art. For example, the motor arrangement discussed above for use with a continuous magnetic medium may be replaced by other well-known means. For instance, if shift registers comprising any one of the above storage cells are used for storing telephone digits in a binary code, a train of input impulses may be used to shift the digit information into the registers during recording and to shift the digit information out of the registers during the read, or calling, operation. Only the desired digit information for the selected telephone number is picked up by appropriate circuits for controlling either DC mode or AC mode of signalling as sent out to the telephone switchboards.

Hence, the invention is not to be construed as limited to the specific embodiments described and shown herein except as defined by the appended claims.

What is claimed is:

1. An automatic telephone dialing apparatus for use with a dial telephone system comprising
    means for storing information concerning a plurality of telephone numbers, each number being represented by a plurality of numeral digits in preassigned digit positions, said storing means including
        a storage medium; and
        means for storing numeral identification signals representing the numeral digits of said plurality of telephone numbers at a plurality of separate regions of said medium, the storage thereof being arranged so that the signals representing the numeral digits of said telephone numbers which are in corresponding digit positions thereof form at least one of a plurality of separate groups, each group being stored at a different one of said regions;
    means for retrieving the signals representing successive numeral digits of a selected one of said telephone numbers from said storage medium; and
    means responsive to said retrieved signals for producing dialing signals for said telephone system.

2. An apparatus in accordance with claim 1 wherein each of said numeral digits represents a numeral from 0 through 9 and said storing means includes
    means for generating a plurality of numeral identification signals, each of said signals representing one of said numerals from 0 to 9;
    means for actuating said signal generating means to produce successive ones of said numeral identification signals representing successive ones of said numerals of a selected telephone number to be stored;
    means for permitting said numeral identification signals to be supplied successively to said storage medium; and
    means for timing the supply of said successive numeral identification signals to permit storage thereof at selected positions at said separate regions of said storage medium.

3. An apparatus in accordance with claim 2 wherein said timing means includes
    gating means for supplying said successive numeral identification signals to said storage medium;
    means for identifying the locations of successive positions at said storage medium along said separate regions thereof;
    means for identifying said selected positions within each of said regions for each numeral identification signal of a selected telephone number to be stored; and
    means responsive to said selected numeral position identifying means and to said storage medium position identifying means for activating said gating means when the location of positions at said storage medium corresponds to said selected positions for each of the numerals of said selected telephone number.

4. An apparatus in accordance with claim 3 wherein said storage medium position locating means includes
    means for recording a train of impulses on such storage medium adjacent to said numeral identification signals stored on said storage medium;
    an impulse counting means for counting the number of impulses on said storage medium as said storage medium is moved along said plurality of separate regions thereof;
    means for storing information identifying a selected one of said activating means which has been activated; and
    means for comparing the stored position identifying information and the impulse counted information for providing a gate operating signal when a coincidence between said information occurs.

5. An apparatus in accordance with claim 4 wherein said impulse counting means includes binary counters comprising a plurality of flip-flop circuits;

said information identifying storage means includes a plurality of contact members connected to said flip-flop circuits;

said comparing means includes means responsive to said contact members for producing said gate operating signal when said coincidence occurs.

6. An apparatus in accordance with claim 2 wherein said numeral identification signal generating means comprises a plurality of oscillators, the outputs of selected combinations of more than one of said oscillators representing each of the numerals from 0 to 9.

7. An apparatus in accordance with claim 6 wherein said numeral identification signal generating means comprises seven oscillators, selected combinations of the outputs of two of said oscillators representing the numerals from 0 to 9.

8. An apparatus in accordance with claim 2 wherein said numeral identification signal generating means comprises means for generating a cyclic signal, selected numbers of cycles of said cyclic signal representing each of the numerals from 0 to 9.

9. An apparatus in accordance with claim 8 wherein the numbers 1, 2, 3, 4, 5, 6, 7, 8, 9 and 0 are represented by 1, 2, 3, 4, 5, 6, 7, 8, 9 and 10 cycles, respectively, of said cyclic signal.

10. An apparatus in accordance with claim 8 wherein said cyclic signal generating means generates a sine wave signal.

11. An apparatus in accordance with claim 8 wherein said cyclic generating means generates an output signal comprising a plurality of periodic impulses.

12. An apparatus in accordance with claim 8 and further including
means for supplying said selected numbers of cycles of said cyclic signal to said storage medium at said selected positions.

13. An apparatus in accordance with claim 12 wherein said supplying means includes
multivibrator means responsive to said cyclic signals for providing impulses to said storage medium;
means for counting the number of said impulses supplied to said storage medium;
means for storing information concerning the pre-selected numbers of impulses to be supplied at each said selected position;
means for comparing said pre-selected numbers of impulses with the output of said counting means to prevent the further supplying of said impulses to said storage medium when a coincidence occurs.

14. An apparatus in accordance with claim 2 wherein said numeral identification signal generating means comprises a plurality of oscillators, the outputs of selected ones of said oscillators representing each of the numerals from 0 to 9.

15. An apparatus in accordance with claim 1 wherein said numeral identification signals are stored at selected positions of said separate regions of said storage medium and wherein said retrieving means includes
means for reproducing all numeral identification signals from said storage medium;
means for identifying the locations of successive positions at said storage medium along said separate regions thereof;
means for identifying said selected positions within each of said regions for each numeral identification signal of a selected telephone number to be retrieved;
gating means;
means responsive to said selected numeral position identifying means and to said storage medium position locating means for activating said gating means when the locations of positions at said storage medium correspond to said selected positions for each of the numerals of said selected telephone number; and
said gating means passing said retrieved numeral identification signals to converting means for producing standard dialing signals for said telephone system.

16. An apparatus in accordance with claim 1 wherein said means responsive to said retrieved signals for producing dialing signals for said telephone system includes
discriminator means for separating said numeral identification signals;
multi-frequency signal generator means;
means for controlling said multi-frequency generator from said discriminator means; and
timing means for controlling the duration of said multi-frequency signals.

17. An apparatus in accordance with claim 1 wherein said means responsive to said retrieved signals for producing dialing signals for said telephone system includes
discriminator means for separating said numeral identification signals;
means for generating DC impulses;
means for supplying said DC impulses to said telephone system;
means for counting said DC impulses;
means responsive to a coincidence between the retrieved numeral identification signals and the count on said counting means for terminating the supplying of DC impulses to said telephone system; and
means for generating time intervals between successive telephone digits.

18. An apparatus in accordance with claim 1 and further including means capable of producing said dialing signals in the form of AC signals and in the form of DC signals.

19. An apparatus in accordance with claim 18 wherein said signal producing means includes
means for generating a mode frequency signal; and
means for storing said mode frequency signal at said storage medium together with said numeral identification signals.

20. An apparatus in accordance with claim 19 wherein said retrieving means includes
means for retrieving said stored mode frequency signal together with said stored numeral identification signals;
means responsive to said retrieved mode frequency signal for providing a clock control signal; and
means responsive to said clock control signal for providing said dial signal in the form of said DC signals for said telephone system.

21. An apparatus in accordance with claim 1 and further including
means responsive to information at a predetermined position at said storage medium for preventing further numeral identification signal retrieval operation of said apparatus after the numeral representing the last numeral digit of said selected telephone number has been retrieved from said storage medium.

22. An apparatus in accordance with claim 1 and further including
- means for providing access to selected pre-assigned positions in said regions for storage, erasure or retrieval of said numeral identification signals, said access providing means including
- gate means adapted to be actuated at said pre-assigned positions;
- control means for activating said gate means, said control means including
  - a plurality of circuit means each having first and second open circuit portions thereof;
  - a plurality of separately operable means associated with each of said plurality of circuit means, each of said separately operable means, when operated, closing said first open circuit portion of its associated circuit means; and
  - contact means for successively closing the second open circuit portions of each of said plurality of circuit means at selected times corresponding to said selected pre-assigned positions on said medium as said medium is moved;
- whereby access is provided to said pre-assigned positions at said selected times.

23. An apparatus in accordance with claim 22 wherein said contact means includes
- a stationary means having a plurality of stationary contact elements mounted thereon, each of said contact elements being connected to one of said separately operable means; and
- a movable means movable relative to said stationary means in a manner corresponding to the movement of said medium and having a contact means for successively contacting each of said stationary contact elements for successively closing said second open circuit portions of each of said plurality of circuit means.

24. An apparatus in accordance with claim 22 wherein said control means includes
- means for supplying an impulse signal when both said first and said second open circuit portions of one of said plurality of circuit means are closed; and
- means responsive to said input impulse for producing a pulse actuation signal for activating said gate means for a pre-selected time period.

25. An apparatus in accordance with claim 24 and further wherein
- said separately operable means comprises a plurality of movable buttons adapted to be operated manually, a portion of each of said buttons being in electrical contact with a corresponding one of said stationary contact elements; and
- a plurality of circuit contact means each mounted adjacent one of said buttons and connected to said circuit means, a portion of each of said buttons being in contact with its corresponding circuit contact means when said button is operated and being out of contact with its corresponding circuit contact means when said button is not operated.

26. An automatic telephone dialing apparatus in accordance with claim 1 and further including
- a plurality of activating means arranged in preselected positions, each of said activating means associated with a selected one of said telephone numbers;
- deflectable means associated with said pr-selected positions and capable of being deflected by said activating means;
- movable selector means responsive to the deflection of said deflectable means;
- contact means responsive to the movement of said movable selector means for storing information identifying the pre-selected position of an activating means which has been actuated.

27. An automatic telephone dialing apparatus in accordance with claim 26 wherein
- said plurality of activating means are arranged in rows and columns;
- said deflectable means includes
  - a first plurality of deflectable means associated with each of said rows;
  - a second plurality of deflectable means associated with each of said columns;
- said movable selector means includes
  - a first movable selector means responsive to the deflection of one of said first plurality of deflectable means;
  - a second movable selector means responsive to the deflection of one of said second plurality of deflectable means; and
- said contact means includes
  - first contact means responsive to said first movable selector means for storing information identifying the row in which each of said activating means is positioned; and
  - second contact means responsive to said second movable selector means for storing information identifying the column in which each of said activating means is positioned.

28. An automatic telephone dialing apparatus in accordance with claim 27 wherein said activating means are buttons adapted to be movable between operating and non-operating positions;
- said first and second plurality of deflectable means are cable-like means, a selected region of which is deflected when one of said buttons associated therewith is moved from its non-operating to its operating position.

29. An automatic telephone dialing apparatus in accordance with claim 28 wherein
- said first and second contact means includes
  - a first and a second plurality of contact elements associated with said first and second contact means, respectively;
  - a first and second plurality of cable-like means associated with each of said first and second plurality of contact elements;
  - first and second movable elements associated with said first and second plurality of cable-like means, respectively, and each adapted to engage a selected number of said associated cable-like means in a coded manner upon movement of said movable elements;
- whereby upon activation of one of said buttons said contact elements are placed in positions in accordance with said coded manner so as to identify the row and column in which said activated button has been operated.

30. An apparatus in accordance with claim 1 wherein said dialing signals producing means comprises
- first register means for registering a selected number of impulses representing a selected numeral digit of a telephone number;
- means responsive to said impulse registering means for providing a multiple frequency output signal comprising a selected combination of more than one frequency representing said selected numeral digit after said selected numeral digit has been stored in said impulse registering means; and means for applying said multiple frequency output signal to said telephone system, whereby AC signals are provided by said apparatus to represent said numeral digits.

31. An apparatus in accordance with claim 30 wherein said dialing signals producing means further includes means for inhibiting the operation of said output means to prevent the application of said multiple frequency output signal to said telephone system;

clock means responsive to a mode frequency signal on said storage medium for generating a plurality of clock impulses;

means responsive to said clock means for providing output impulses to said telephone system;

second register means for registering the number of clock impulses supplied by said clock means;

means for comparing the impulses registered in said first and second register means to inhibit the further generation of impulses from said clock means when the contents of said first and second registers coincide;

whereby said apparatus provides DC signals to said telephone system.

32. An automatic telephone dialing apparatus for use with a dial telephone system comprising means for storing information concerning a plurality of telephone numbers, each number being represented by a plurality of numeral digits in pre-assigned digit positions, said storing means including a storage medium; and means for storing numeral identification signals representing the numeral digits of said plurality of telephone numbers at a plurality of separate regions of said medium, the storage thereof being arranged so that the signals representing the numeral digits of said telephone numbers which are in corresponding digit positions thereof form a plurality of separate groups, each group being stored at a different one of said regions;

means for retrieving the signals representing successive numeral digits of a selected one of said telephone numbers from said storage medium; and means responsive to said retrieved signals for producing dialing signals for said telephone system.

33. An automatic telephone dialing apparatus for use with a dial telephone system comprising means for storing information concerning a plurality of groups of telephone numbers, each group comprising a plurality of said telephone numbers, each number being represented by a plurality of numeral digits in pre-assigned digit positions, said storing means including a storage medium; and means for storing numeral identification signals representing the numeral digits of the plurality of telephone numbers of each said group at a plurality of separate regions of said medium, the storage thereof being arranged so that the signals representing the numeral digits of the telephone numbers in each group which are in corresponding digit positions thereof form a plurality of separate sub-groups, each sub-group being stored at a different sub-region of said separate regions;

means for retrieving the signals representing successive numeral digits of a selected one of said telephone numbers from said storage medium; and means responsive to said retrieved signals for producing dialing signals for said telephone system.

34. An automatic telephone dialing apparatus for use with a dial telephone system comprising means for storing information concerning two groups of telephone numbers designated as the odd group telephone numbers and the even group telephone numbers, respectively, each number being represented by a plurality of numeral digits in pre-assigned digit positions, said storing means including a storage medium; and means for storing numeral identification signals representing the numeral digits of said plurality of telephone numbers at two separate regions of said medium, the storage thereof being arranged so that the signals representing the numeral digits of said odd group telephone numbers which are in corresponding digit positions thereof form a first plurality of separate sub-groups and the signals representing the numeral digits of said even group telephone numbers which are in corresponding digit positions thereof form a second plurality of separate sub-groups, each sub-group of said first and said second plurality of separate sub-groups being stored at a different one of said regions;

means for retrieving the signals representing successive numeral digits of a selected one of said telephone numbers from said storage medium; and means responsive to said retrieved signals for producing dialing signals for said telephone system.

35. An automatic telephone dialing apparatus for use with a dial telephone system comprising means for storing information concerning a plurality of groups of telephone numbers, each group comprising a pair of sub-groups designated as first odd sub-group telephone numbers and first even sub-group telephone numbers and each number being represented by a plurality of numeral digits in pre-assigned digit positions, said storing means including a storage medium; and means for storing numeral identification signals representing the numeral digits of the plurality of telephone numbers of each said group at a plurality of separate regions of said medium, the storage thereof being arranged so that the signals representing the numeral digits of the first odd sub-group telephone numbers in each said group which are in corresponding digit positions thereof form a first plurality of separate second odd sub-groups within each said first odd sub-group and the signals representing the numeral digits of the first even sub-group telephone numbers in each said group which are in corresponding digit positions thereof form a second plurality of separate second even sub-groups within each said first even sub-group, each second odd sub-group and second even sub-group being stored at a different sub-region of said separate regions;

means for retrieving the signals representing successive numeral digits of a selected one of said telephone numbers from said storage medium; and means responsive to said retrieved signals for producing dialing signals for said telephone system.

* * * * *